(12) United States Patent
Lee

(10) Patent No.: US 10,977,407 B2
(45) Date of Patent: Apr. 13, 2021

(54) SUPERPOWER GATING CELL AND INTEGRATED CIRCUIT INCLUDING THE SAME

(71) Applicant: SAMSUNG ELECTRONICS CO., LTD., Suwon-si (KR)

(72) Inventor: Hoijin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/562,221

(22) Filed: Sep. 5, 2019

(65) Prior Publication Data

US 2020/0082045 A1 Mar. 12, 2020

(30) Foreign Application Priority Data

Sep. 7, 2018 (KR) .................... 10-2018-0107392
Mar. 21, 2019 (KR) .................... 10-2019-0032537

(51) Int. Cl.
*G06F 30/392* (2020.01)
*G06F 30/394* (2020.01)
*G06F 30/398* (2020.01)

(52) U.S. Cl.
CPC .......... *G06F 30/392* (2020.01); *G06F 30/394* (2020.01); *G06F 30/398* (2020.01)

(58) Field of Classification Search
CPC ...... G06F 30/30; G06F 30/392; G06F 30/394; G06F 30/398; G06F 2119/06; G06F 2115/08
USPC ................................. 716/100, 110, 120, 126
See application file for complete search history.

(56) References Cited

U.S. PATENT DOCUMENTS

| | | | |
|---|---|---|---|
| 7,509,613 B2 | 3/2009 | Frenkil | |
| 7,989,849 B2 | 8/2011 | Sherlekar et al. | |
| 8,341,563 B1 * | 12/2012 | Kretchmer | G06F 30/392 716/100 |
| 8,392,862 B1 * | 3/2013 | Siguenza | G06F 30/392 716/120 |
| 8,726,216 B2 | 5/2014 | Suzuki et al. | |
| 9,189,586 B2 | 11/2015 | Suzuki et al. | |
| 9,627,037 B2 | 4/2017 | Kim et al. | |
| 9,639,650 B2 | 5/2017 | Yuan et al. | |
| 9,799,639 B2 | 10/2017 | Chao et al. | |
| 2008/0012424 A1 | 1/2008 | Shin et al. | |
| 2013/0200945 A1 * | 8/2013 | Siguenza | G06F 30/392 716/120 |
| 2017/0062474 A1 | 3/2017 | Lee | |

* cited by examiner

*Primary Examiner* — Paul Dinh
(74) *Attorney, Agent, or Firm* — Volentine, Whitt & Francos, PLLC

(57) ABSTRACT

An integrated circuit includes an intellectual property (IP) block including a plurality of standard cells. A first power gating cell supplies power to the IP block via a first power rail extending in a first horizontal direction. A first conductive line extends in a second horizontal direction perpendicular to the first horizontal direction in a first metal layer. A second power gating cell is arranged adjacent to the first power gating cell in the second horizontal direction to supply power to the IP block via a second power rail extending in the first horizontal direction. A second conductive line extends in the second horizontal direction in the first metal layer. The first conductive line is coupled with the second conductive line in the second horizontal direction.

14 Claims, 19 Drawing Sheets

SUPERPOWER GATING CELL AND INTEGRATED CIRCUIT INCLUDING THE SAME

CROSS-REFERENCE TO RELATED APPLICATIONS

This application claims the benefit of Korean Patent Application No. 10-2018-0107392, filed on Sep. 7, 2018, and Korean Patent Application No. 10-2019-0032537, filed on Mar. 21, 2019, in the Korean Intellectual Property Office, the disclosures of which are incorporated herein in their entirety by reference.

BACKGROUND

The disclosure relates to integrated circuits, and more particularly, to an integrated circuit including a superpower gating cell, and a method of fabricating the integrated circuit.

As semiconductor processes are miniaturized, the widths of conductive lines (or metal lines) included in an integrated circuit decrease. As intervals between the conductive lines decrease, the resistance of each conductive line and the capacitance between conductive lines may increase. In other words, as semiconductor processes are miniaturized, resistances and capacitances of conductive lines increase. Accordingly, a signal transition of an integrated circuit may be delayed, and power consumption of the integrated circuit increases, leading to a reduction in the performance of the entire integrated circuit.

SUMMARY

The disclosure provides a superpower gating cell capable of improving the performance of an integrated circuit by reducing resistances and capacitances of conductive lines included in the integrated circuit, an integrated circuit including the superpower gating cell, and a method of fabricating the integrated circuit.

According to an aspect of the disclosure, there is provided: an integrated circuit including an intellectual property (IP) block including a plurality of standard cells; a first power gating cell arranged to supply power to the IP block via a first power rail extending in a first horizontal direction, and including a first conductive line extending in a second horizontal direction perpendicular to the first horizontal direction in a first metal layer; and a second power gating cell arranged adjacent to the first power gating cell in the second horizontal direction to supply power to the IP block via a second power rail extending in the first horizontal direction, and including a second conductive line extending in the second horizontal direction in the first metal layer. The first conductive line is coupled with the second conductive line in the second horizontal direction.

According to another aspect of the disclosure, there is provided an integrated circuit including: a first intellectual property (IP) block including a plurality of first standard cells; and a first superpower gating cell including a plurality of first power gating cells and arranged to supply power to the first IP block via a plurality of first power rails each extending in a first horizontal direction. The first superpower gating cell includes: a plurality of first conductive lines each extending in the first horizontal direction in a first metal layer and a second metal layer, to be electrically connected with the plurality of first power rails; and a plurality of second conductive lines each extending in a second horizontal direction perpendicular to the first horizontal direction to electrically connect the plurality of first power gating cells to each other in a third metal layer between the first and second metal layers in a vertical direction.

According to another aspect of the disclosure, there is provided an integrated circuit including: an intellectual property (IP) block including a plurality of standard cells; and a superpower gating cell including a plurality of power gating cells and arranged to supply power to the IP block via a plurality of power rails each extending in a first horizontal direction. The superpower gating cell includes a plurality of first conductive lines each extending in the first horizontal direction in a first metal layer to be electrically connected with first power rails transmitting a power supply voltage from among the plurality of power rails; and a plurality of second conductive lines each extending in a second horizontal direction perpendicular to the first horizontal direction in the first metal layer to be coupled with the plurality of first conductive lines.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Hereinafter, the disclosure will be described more fully with reference to the accompanying drawings, in which exemplary embodiments of the disclosure are shown.

Figure 1:
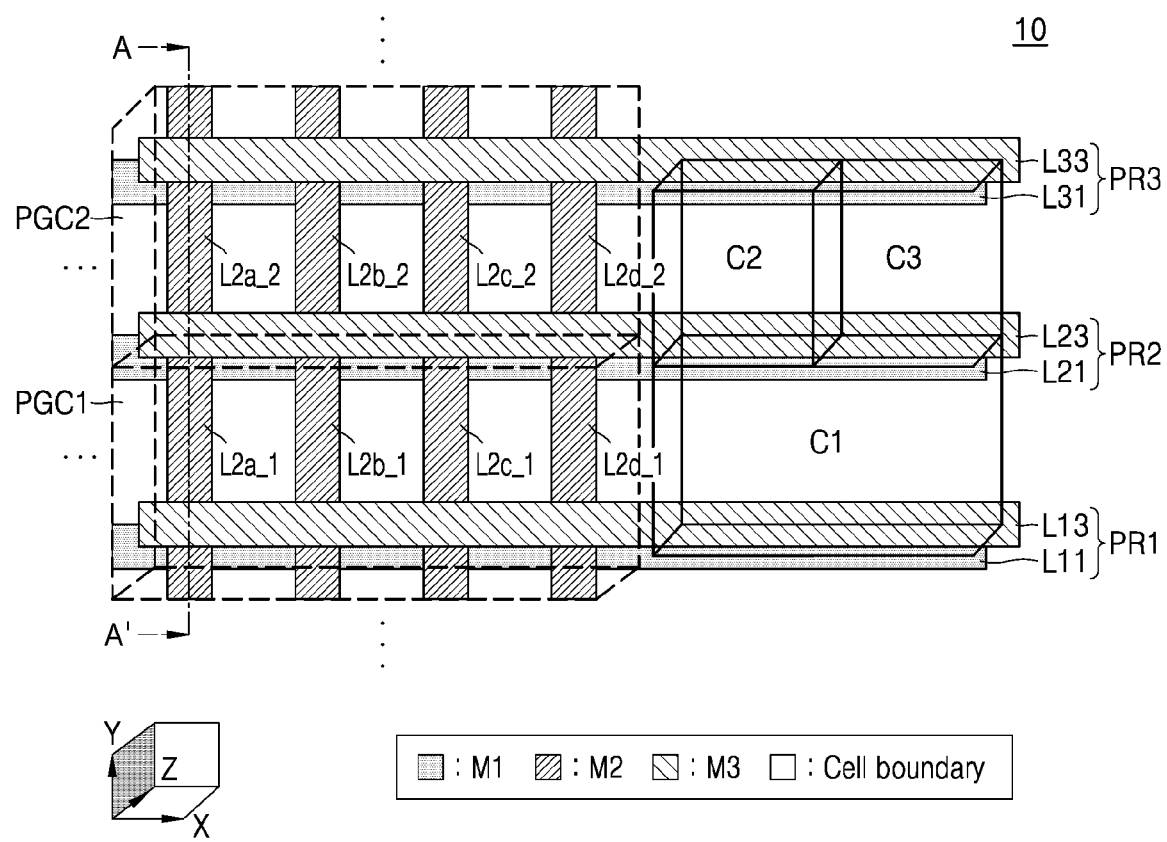
FIG. 1 is a view illustrating a portion of an integrated circuit according to an embodiment of the disclosure.

FIG. 1 is a schematic diagram of a portion of an integrated circuit 10 according to an embodiment of the disclosure. For convenience of illustration, FIG. 1 illustrates only some of the layers included in the integrated circuit 10. Drawings used herein may illustrate some of the layers formed by a back end of line (BEOL) process, except for the layers formed by a front end of line (FEOL) process. In addition, a plane made up of an X-axis and a Y-axis may be referred to as a horizontal plane, a component arranged in a +Y direction relative to another component may be referred to as being above the other component, and a component arranged in a −Y direction relative to another component may be referred to as being below the other component. Thus, a boundary arranged horizontally in the +Y direction relative to the boundaries of a certain power gating cell or a superpower gating cell may be referred to as a top boundary, and a boundary arranged horizontally in the −Y direction relative to the boundaries of the certain power gating cell or superpower gating cell may be referred to as a bottom boundary.

Referring to FIG. 1, as shown in bold solid lines, the integrated circuit 10 may include standard cells C1, C2, and C3. Each standard cell is the unit of a layout included in the integrated circuit 10, and thus the integrated circuit 10 may include a plurality of various standard cells. The standard cells may have a structure that conforms to a predetermined standard. For example, as shown in FIG. 1, the standard cells C1, C2, and C3 may have certain heights (namely, lengths in a Y-axis direction), and may have boundaries that overlap a pair of power rails PR1 and PR2 or PR2 and PR3 spaced apart from each other in the Y-axis direction and each extending in an X-axis direction to be parallel to each other.

The integrated circuit 10 may include first and second power gating cells PGC1 and PGC2 for supplying power to the standard cells C1, C2, and C3 via power rails PR1, PR2, and PR3. However, FIG. 1 illustrates only a portion of the integrated circuit 10 including a boundary between the first power gating cell PGC1 and the second power gating cell PGC2 in order to describe a connection relationship between the first power gating cell PGC1 and the second power gating cell PGC2, and the first and second power gating cells PGC1 and PGC2 may have larger lengths in the Y-axis direction than the standard cells C1, C2, and C3. The boundary between the first power gating cell PGC1 and the second power gating cell PGC2 shown in FIG. 1 may be defined in various ways according to embodiments. It will now be assumed for convenience of explanation that the first power gating cell PGC1 and the second power gating cell PGC2 have overlapping boundaries on the power rail PR2.

The first and second power gating cells PGC1 and PGC2 may include a layer M1, a layer M2, and a layer M3, and may include patterns formed on the layers M1 through M3 in order to supply power to the standard cells C1, C2, and C3 via power gating control. The layers M1 through M3 may be conductive layers, for example, metal layers, and may be spaced apart from each other in a Z-axis direction and arranged parallel to each other. In detail, the first power gating cell PGC1 may include patterns that enable a first voltage (or a power voltage) applied to the first power gating cell PGC1 to be output as a second voltage (or a virtual voltage) via power gating control. The first power gating cell PGC1 may further include an input pin that receives the first voltage, and an output pin that outputs the second voltage. According to some embodiments, the input pin and the output pin of the first power gating cell PGC1 may be patterns formed on the layer M1 or M3. The structure of the first power gating cell PGC1 is also applicable to the second power gating cell PGC2. A connection relationship between the first power gating cell PGC1 and the second power gating cell PGC2 will now be focused on and described.

The first power gating cell PGC1 may include respective portions of a conductive line L11 and a conductive line L13 in the X-axis direction that supply a certain voltage to the power rail PR1, and respective portions of a conductive line L21 and a conductive line L23 in the X-axis direction that supply a certain voltage to the power rail PR2. The second power gating cell PGC2 may include respective portions of the conductive lines L21 and L23 in the X-axis direction that supply a certain voltage to the power rail PR2, and respective portions of a conductive line L31 and a conductive line L33 in the X-axis direction that supply a certain voltage to the power rail PR3. According to some embodiments, a positive supply voltage (for example, the second voltage) may be applied to the power rail PR1, a negative supply voltage (for example, a ground voltage) may be applied to the power rail PR2, and the positive supply voltage (for example, the second voltage) may be applied to the power rail PR3. According to other embodiments, the negative supply voltage (for example, the ground voltage) may be applied to the power rail PR1, the positive supply voltage (for example, the second voltage) may be applied to the power rail PR2, and the negative supply voltage (for example, the ground voltage) may be applied to the power rail PR3. Hereinafter, according to example embodiments of the disclosure, the positive supply voltages are applied to the power rail PR1 and the power rail PR3, and the negative supply voltage is applied to the power rail PR2. However, the disclosure is not limited thereto.

According to an embodiment, the first power gating cell PGC1 may include conductive lines $L2a\_1$ through $L2d\_1$ each extending in the Y-axis direction in the layer M2, and the second power gating cell PGC2 may include conductive lines $L2a\_2$ through $L2d\_2$ each extending in the Y-axis direction in the layer M2. The conductive lines $L2a\_1$ through $L2d\_1$ of the first power gating cell PGC1 may be coupled with the conductive lines $L2a\_2$ through $L2d\_2$ of the second power gating cell PGC2, respectively. According to an embodiment, the first power gating cell PGC1 and the second power gating cell PGC2 may be stacked on each other in the Y-axis direction, and at the same time the conductive lines $L2a\_1$ through $L2d\_1$ formed in the layer M2 may be coupled with the conductive lines $L2a\_2$ through $L2d\_2$ formed in the layer M2. According to embodiments, a sum of lengths in the Y-axis direction of each of the conductive lines $L2a\_1$ through $L2d\_1$ and each of the conductive lines $L2a\_2$ through $L2d\_2$ coupled with each other may be an n multiple (where n is an integer equal to or greater than 4) of a length in the Y-axis direction of each of the standard cells C1, C2, and C3. The length in the Y-axis direction of each of the standard cells C1, C2, and C3 will now be referred to as the height of a standard cell.

A portion of the conductive line L11 and a portion of the conductive line L21 may be formed in the layer M1 of the first power gating cell PGC1, a portion of the conductive line L13 and a portion of the conductive line L23 may be formed in the layer M3 of the first power gating cell PGC1, and the conductive lines L2a_1 through L2d_1 may be formed in the layer M2 of the first power gating cell PGC1. A portion of the conductive line L21 and a portion of the conductive line L31 may be formed in the layer M1 of the second power gating cell PGC2, a portion of the conductive line L23 and a portion of the conductive line L33 may be formed in the layer M3 of the second power gating cell PGC2, and the conductive lines L2a_2 through L2d_2 may be formed in the layer M2 of the second power gating cell PGC2. Although FIG. 1 illustrates the case where 4 conductive lines formed in the layer M2 of the first power gating cells PGC1 are respectively coupled with 4 conductive lines formed in the layer M2 of the second power gating cell PGC2, this is merely an embodiment, and the disclosure is not limited thereto. Various structures in which more or less conductive lines than the 4 conductive lines formed in the layer M2 in FIG. 1 are coupled are applicable to the first and second power gating cells PGC1 and PGC2.

According to an embodiment, depending on the types of voltages applied to the conductive line L11, the conductive line L13, the conductive line L21, and the conductive line L23, the conductive lines L2a_1 through L2d_1 of the first power gating cell PGC1 may be directly coupled with the conductive line L11, the conductive line L13, the conductive line L21, and the conductive line L23 through a via or the like, or may not be directly coupled with the conductive line L11, the conductive line L13, the conductive line L21, and the conductive line L23. For example, when the positive supply voltage (for example, the second voltage) is applied to the conductive line L11 and the conductive line L13, the conductive lines L2a_1 through L2d_1 may be directly coupled with the conductive line L11 and the conductive line L13 through a via or the like, and, when the negative supply voltage (for example, the ground voltage) is applied to the conductive line L21 and the conductive line L23, the conductive lines L2a_1 through L2d_1 may not be directly coupled with the conductive line L21 and the conductive line L23.

Depending on the types of voltages applied to the conductive line L21, the conductive line L23, the conductive line L31, and the conductive line L33, the conductive lines L2a_2 through L2d_2 of the second power gating cell PGC2 may be directly coupled with the conductive line L21, the conductive line L23, the conductive line L31, and the conductive line L33 through a via or the like, or may not be directly coupled with the conductive line L21, the conductive line L23, the conductive line L31, and the conductive line L33. For example, when the negative supply voltage is applied to the conductive line L21 and the conductive line L23, the conductive lines L2a_2 through L2d_2 may not be directly coupled with the conductive line L21 and the conductive line L23, and, when the positive supply voltage is applied to the conductive line L31 and the conductive line L33, the conductive lines L2a_2 through L2d_2 may be directly coupled with the conductive line L31 and the conductive line L33.

The first power gating cell PGC1 may further include conductive lines (not shown) formed in the layer M3 to route the first voltage toward the layer M2, conductive lines (not shown) formed in the layer M3 or M1 to route the second voltage toward the power rail PR1, and conductive lines (not shown) formed in the layer M3 or M1 to route the ground voltage toward the power rail PR2. The conductive lines L2a_1 through L2d_1 may be directly coupled with at least one of the conductive lines (not shown) through a via. The second power gating cell PGC2 may further include conductive lines (not shown) formed in the layer M3 to route the first voltage toward the layer M2, conductive lines (not shown) formed in the layer M3 or M1 to route the second voltage toward the power rail PR3, and conductive lines (not shown) formed in the layer M3 or M1 to route the ground voltage toward the power rail PR2. The conductive lines L2a_2 through L2d_2 may be directly coupled with at least one of the conductive lines (not shown) through a via.

As such, the first power gating cell PGC1 and the second power gating cell PGC2 may be coupled with each other via the conductive lines L2a_1 through L2d_1 and the conductive lines L2a_2 through L2d_2 formed in the layer M2. This coupling is also applicable to other power gating cells (not shown) included in the integrated circuit 10, and accordingly, resistance and capacitance of a power network with respect to the integrated circuit 10 may be minimized. As a result, an IR drop of the integrated circuit 10 may be eased, and performance of the integrated circuit 10 may improve. Power gating cells connected via conductive lines formed in the layer M2 may be hereinafter defined as a superpower gating cell, and embodiments of the superpower gating cell will be described later.

Figure 2:
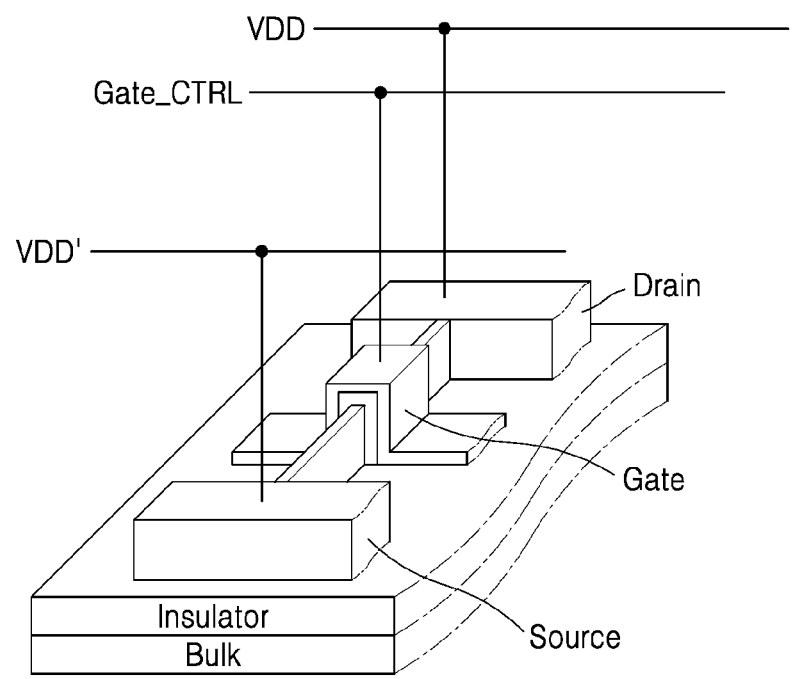
FIG. 2 is a view for explaining, in detail, a lower structure in a Z-axis direction of a layer M1 of a first power gating cell of FIG. 1.

FIG. 2 is a view for explaining, in detail, a lower structure in the Z-axis direction of the layer M1 of the first power gating cell PGC1 of FIG. 1.

Referring to FIGS. 1 and 2, the first power gating cell PGC1 may include a bulk, an insulator, a source, a drain, and a gate formed on the insulator. An example of a Fin field effect transistor (FinFET) structure is applicable to the structure of FIG. 2. A first voltage $V_{DD}$ may be supplied to the drain via the patterns formed in the layers M1 through M3 of the first power gating cell PGC1. In other words, the patterns formed in the layers M1 through M3 may route the first voltage $V_{DD}$ provided from an external source to the drain and may include the conductive lines L2a_1 through L2d_1. The first power gating cell PGC1 may further include a plurality of vias for electrically coupling the patterns with each other. A gate control signal Gate_CTRL may be applied to the gate via other patterns formed in the layers M1 through M3 of the first power gating cell PGC1. The first power gating cell PGC1 may further include a plurality of vias for electrically coupling the other patterns with each other. A channel (not shown) may be formed between the drain and the source according to the gate control signal Gate_CTRL applied to the gate, and the first voltage $V_{DD}$ applied to the drain may be output as a second voltage $V_{DD'}$ via the channel and the source. The second voltage $V_{DD'}$ may be supplied to the standard cell C1 via still other patterns formed in the layers M1 through M3 of the first power gating cell PGC1. The first power gating cell PGC1 may further include a plurality of vias for electrically coupling the still other patterns with each other.

Figure 3:
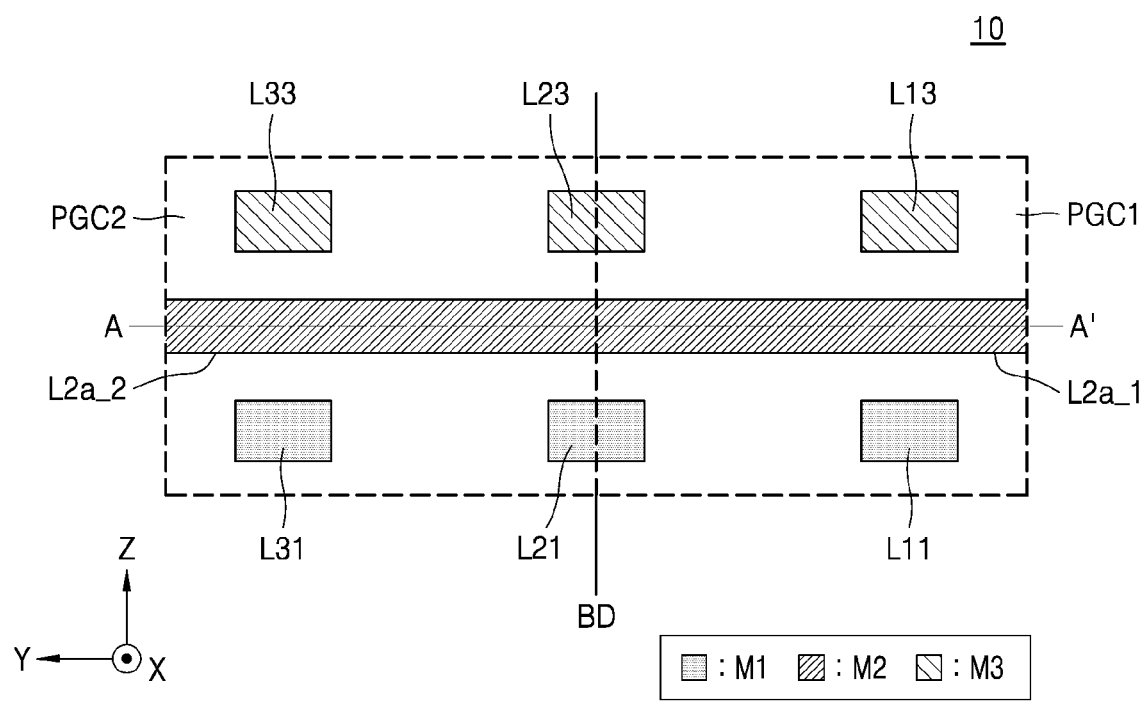
FIG. 3 is a cross-sectional view of the integrated circuit taken along line A-A' of FIG. 1 parallel to the Z-axis direction.

FIG. 3 is a cross-sectional view of the integrated circuit 10 taken along line A-A' of FIG. 1 parallel to the Z-axis direction. For convenience of illustration, FIG. 3 illustrates only the layers M1, M2, and M3 from among the layers included in the integrated circuit 10.

Referring to FIGS. 1 and 3, the power rail PR1 may include the conductive lines L11 and L13 each extending in the X-axis direction in the first power gating cell PGC1 parallel to each other and respectively formed in the layers M1 and M3, the power rail PR2 may include the conductive lines L21 and L23 each extending in the X-axis direction parallel to each other and respectively formed in the layers M1 and M3 at a boundary BD between the first and second power gating cells PGC1 and PGC2, and the power rail PR3 may include the conductive lines L31 and L33 each extending in the X-axis direction in the second power gating cell PGC2 parallel to each other and respectively formed in the layers M1 and M3.

The conductive line L2a_1 extending in the Y-axis direction in the layer M2 of the first power gating cell PGC1 may be coupled with the conductive line L2a_2 extending in the Y-axis direction in the layer M2 of the second power gating cell PGC2. In other words, the conductive line L2a_1 and the conductive line L2a_2 may be arranged in the Y-axis direction to extend across the first power gating cell PGC1 and the second power gating cell PGC2 in the Y-axis direction in the layer M2.

Although the conductive lines L11, L21, and L31 of the layer M1 are spaced apart from each other at equal intervals in the Y-axis direction and the conductive lines L13, L23, and L33 of the layer M3 are also spaced apart from each other at equal intervals in the Y-axis direction in FIG. 3, this is merely an example embodiment, and the disclosure is not limited thereto. The conductive lines L11, L21, and L31 may be spaced apart from each other at different intervals and the conductive lines L13, L23, and L33 may be spaced apart from each other at different intervals.

Figure 4:
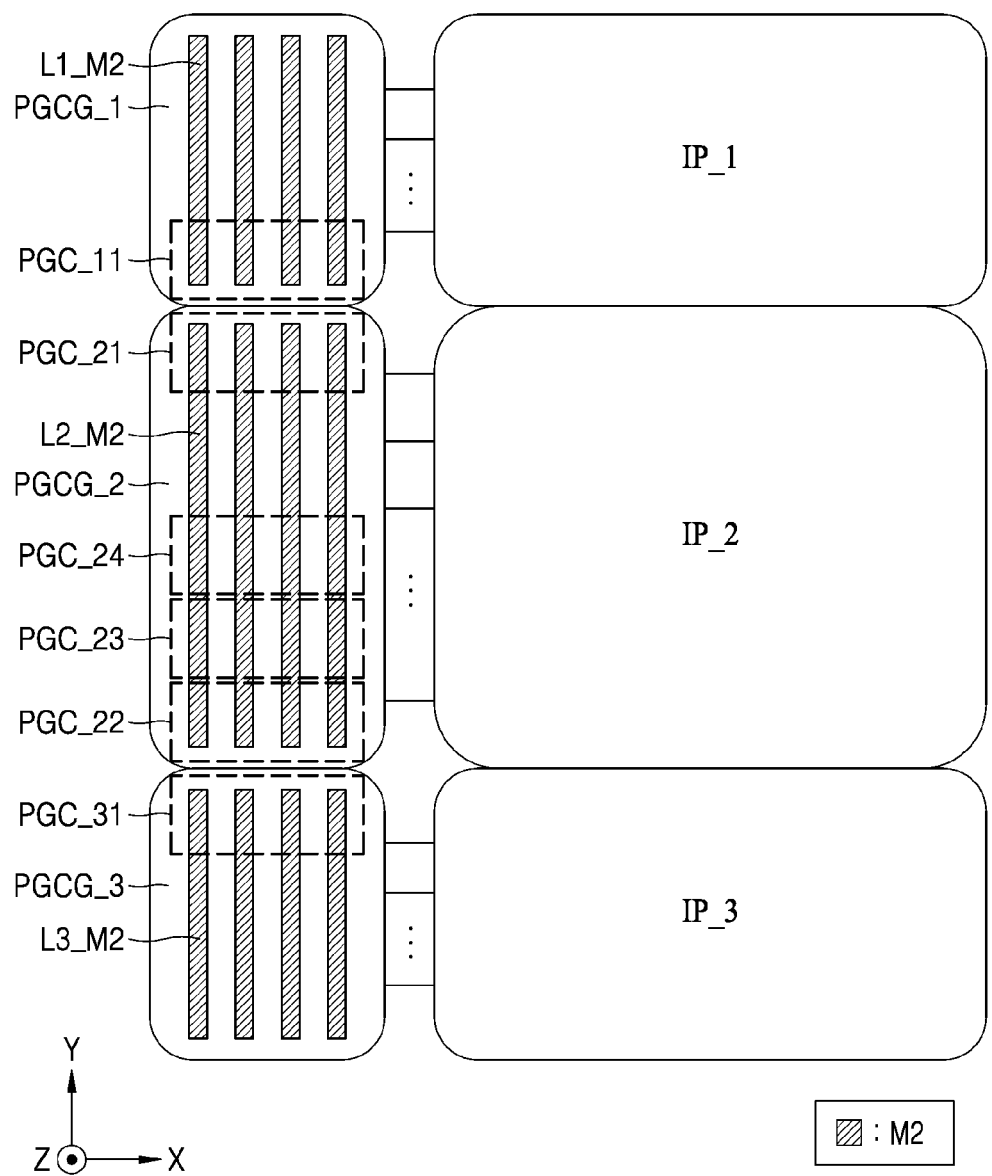
FIG. 4 is a view for explaining power gating cell groups that respectively provide power to intellectual property (IP) blocks of an integrated circuit according to an embodiment of the disclosure.

FIG. 4 is a view for explaining first through third power gating cell groups PGCG_1 through PGCG_3 that respectively provide power to first through third intellectual property (IP) blocks IP_1 through IP_3 of an integrated circuit 200 according to an embodiment of the disclosure. Hereinafter, an IP block may correspond to a circuit block in which a plurality of standard cells are laid out based on a planned design method in order to perform a specific function. A power gating cell group may correspond to a unit in which a plurality of power gating cells that supply power to a single IP block are defined as a single group.

Referring to FIG. 4, the integrated circuit 200 may include a plurality of power gating cell groups, namely, the first, second, and third power gating cell groups PGCG_1, PGCG_2, and PGCG_3, and a plurality of IP blocks, namely, the first, second, and third IP blocks IP_1, IP_2, and IP_3. The first through third power gating cell groups PGCG_1 through PGCG_3 may supply power to the first through third IP blocks IP_1 through IP_3, respectively, via power rails each extending in the X-axis direction. In detail, the first power gating cell group PGCG_1 may include a plurality of power gating cells (including a first power gating cell PGC_11) that supply power to the first IP block IP_1, the second power gating cell group PGCG_2 may include a plurality of power gating cells (including second through fifth power gating cells PGC_21 through PGC_24) that supply power to the second IP block IP_2, and the third power gating cell group PGCG_3 may include a plurality of power gating cells (including a sixth power gating cell PGC_31) that supply power to the third IP block IP_3. In FIG. 4, for convenience of explanation, the first through third IP blocks IP_1 through IP_3 having different lengths in the Y-axis direction are arranged such that their top boundaries and/or bottom boundaries contact each other. However, this is merely an example embodiment, and the disclosure is not limited thereto. The lengths in the Y-axis direction of the first through third IP blocks IP_1 through IP_3 may be the same as or different from each other, and the lengths in the X-axis direction of the first through third IP blocks IP_1 through IP_3 may be the same as or different from each other. Standard cells included in the first through third IP blocks IP_1 through IP_3, and layout methods of the standard cells may be the same as or different from each other.

The power gating cells included in the first power gating cell group PGCG_1 may be stacked on each other in the Y-axis direction, and conductive lines each extending in the Y-axis direction in the layers M2 of the power gating cells may be coupled with each other, and thus, like conductive lines L1_M2, conductive lines that electrically couple the power gating cells of the first power gating cell group PGCG_1 with each other may be included in the first power gating cell group PGCG_1. The first power gating cell PGC_11 is closest to the bottom boundary of the first power gating cell group PGCG_1, and may be arranged adjacent to a boundary between the first power gating cell group PGCG_1 and the second power gating cell group PGCG_2. Conductive lines each extending in the Y-axis direction in the layer M2 of the first power gating cell PGC_11 may each extend to only a point that is a certain distance away from the first power gating cell PGC_11 or the bottom boundary of the first power gating cell group PGCG_1 in the Y-axis direction. In other words, the conductive lines of the first power gating cell PGC_11 may restrictedly extend not to contact a boundary of the second power gating cell group PGCG_2.

The power gating cells included in the second power gating cell group PGCG_2 may be stacked on each other in the Y-axis direction, and conductive lines each extending in the Y-axis direction in the layers M2 of the power gating cells may be coupled with each other, and thus, like conductive lines L2_M2, conductive lines that electrically couple the power gating cells of the second power gating cell group PGCG_2 with each other may be included in the second power gating cell group PGCG_2. The second power gating cell PGC_21 is closest to the top boundary of the second power gating cell group PGCG_2, and may be arranged adjacent to the boundary between the second power gating cell group PGCG_2 and the first power gating cell group PGCG_1. Conductive lines each extending in the Y-axis direction in the layer M2 of the second power gating cell PGC_21 may each extend to only a point that is a certain distance away from the second power gating cell PGC_21 or the top boundary of the second power gating cell group PGCG_2 in the Y-axis direction. In other words, the conductive lines of the second power gating cell PGC_21 may restrictedly extend not to contact the boundary of the first power gating cell group PGCG_1. The third power gating cell PGC_22 is closest to the bottom boundary of the second power gating cell group PGCG_2, and may be arranged adjacent to a boundary between the second power gating cell group PGCG_2 and the third power gating cell group PGCG_3. Conductive lines each extending in the Y-axis direction in the layer M2 of the third power gating cell PGC_22 may each extend to only a point that is a certain distance away from the third power gating cell PGC_22 or the bottom boundary of the second power gating cell group PGCG_2 in the Y-axis direction. In other words, the conductive lines of the third power gating cell PGC_22 may restrictedly extend not to contact a boundary of the third power gating cell group PGCG_3.

The power gating cells included in the third power gating cell group PGCG_3 may be stacked on each other in the Y-axis direction, and conductive lines each extending in the Y-axis direction in the layers M2 of the power gating cells may be coupled with each other, and thus, like conductive lines L3_M2, conductive lines that electrically couple the power gating cells of the third power gating cell group PGCG_3 with each other may be included in the third power gating cell group PGCG_3. The sixth power gating cell PGC_31 is closest to the top boundary of the third power gating cell group PGCG_3, and may be arranged adjacent to the boundary between the third power gating cell group PGCG_3 and the second power gating cell group PGCG_2. Conductive lines each extending in the Y-axis direction in the layer M2 of the sixth power gating cell PGC_31 may each extend to only a point that is a certain distance away from the sixth power gating cell PGC_31 or the top boundary of the third power gating cell group PGCG_3 in the Y-axis direction. In other words, the conductive lines of the sixth power gating cell PGC_31 may restrictedly extend not to contact the boundary of the third power gating cell group PGCG_3.

As shown in FIG. 4, the conductive lines formed in the layer M2 of the first, second, third, and sixth power gating cells PGC_11, PGC_21, PGC_22, and PGC_31 arranged adjacent to the boundaries of the first through third the power gating cell groups PGCG_1 through PGCG_3 may extend restrictedly. However, the embodiment of FIG. 4 is merely an example, and thus various embodiments are applicable to the first, second, third, and sixth power gating cells PGC_11, PGC_21, PGC_22, and PGC_31 such that conductive lines formed in the layer M2 are separated by the first through third power gating cell groups PGCG_1 through PGCG_3.

Hereinafter, power gating cells electrically coupled with each other due to coupling of the conductive lines each extending in the layer M2 in the Y-axis direction perpendicular to the X-axis direction, which is an extension direction of a power rail may be defined as a superpower gating cell. Accordingly, the first through third power gating cell groups PGCG_1 through PGCG_3 may be referred to as superpower gating cells.

In FIG. 4, all of the power gating cells included in the first through third power gating cell groups PGCG_1 through PGCG_3 as superpower gating cells are coupled via the conductive lines L1_M2 through L3_M2 formed in the layer M2. However, this is merely an example embodiment, and the first through third power gating cell groups PGCG_1 through PGCG_3 may be implemented as including a plurality of superpower gating cells. In other words, the conductive lines L1_M2 through L3_M2 formed in the layers M2 of the first through third power gating cell group PGCG_1 through PGCG_3 may be implemented as being separated at intervals of a certain length in the Y-axis direction (for example, a length that is n times the height of a standard cell), and a detailed description thereof will be given with reference to FIG. 7 and the like.

The conductive lines L1_M2 through L3_M2 of the layer M2 may be formed according to a design rule. For example, the conductive lines L1_M2 through L3_M2 of the layer M2 may be formed without any discontinuity within a superpower gating cell. The unit of a superpower gating cell may depend upon a design rule about the length of a conductive line of the layer M2.

Figure 5:
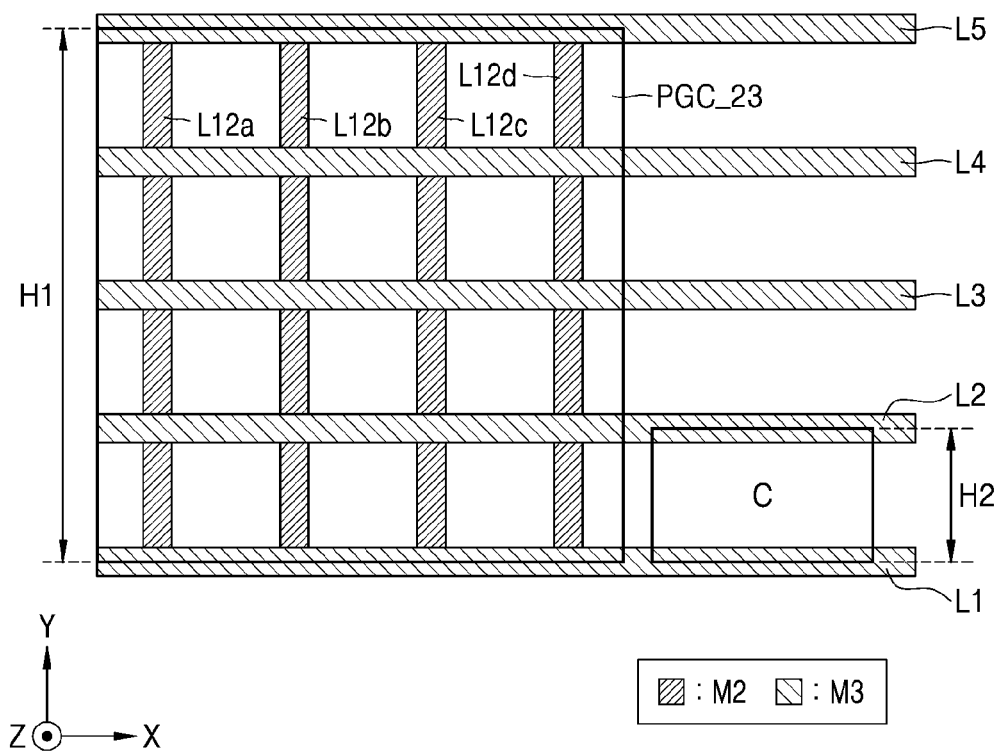
FIG. 5 is a view for explaining a structural relationship between a third power gating cell of FIG. 4 and a standard cell.

FIG. 5 is a view for explaining a structural relationship between the third power gating cell PGC_23 of FIG. 4 and a standard cell C. FIG. 5 is a plan view of the third power gating cell PGC_23, and a structure of the layer M1 of the third power gating cell PGC_23 is omitted.

Referring to FIG. 5, the third power gating cell PGC_23 may include the layers M2 and M3, and may include patterns formed on the layers M2 and M3 in order to supply power to standard cells via power gating control. In detail, the third power gating cell PGC_23 may include portions of conductive lines L1 through L5 formed in the X-axis direction in the layer M3 and included in power rails, and conductive lines L12a through L12d formed in the Y-axis direction in the layer M2 to reduce a resistance and a capacitance. The third power gating cell PGC_23 may have a first length H1 in the Y-axis direction, and the conductive lines L12a through L12d formed in the layer M2 may have lengths that are the same as or similar to the first length H1 in the Y-axis direction. The standard cell C may have a second height H2 in the Y-axis direction. The first length H1 of the third power gating cell PGC_23 may correspond to at least four times the second length H2 of the standard cell C. However, this is merely an example embodiment, and the disclosure is not limited thereto. The first length H1 may be n times (where n is an integer equal to or greater than 4) the second length H2.

According to embodiments, the conductive lines L12a through L12d formed in the layer M2 may be coupled with the conductive lines formed in the layer M2 of another power gating cell (second or fourth power gating cell PGC_22 or PGC_24 of FIG. 4), and a length in the Y-axis direction of the conductive lines coupled in this way may be n times or greater the second length H2 of the standard cell C.

Figure 6:
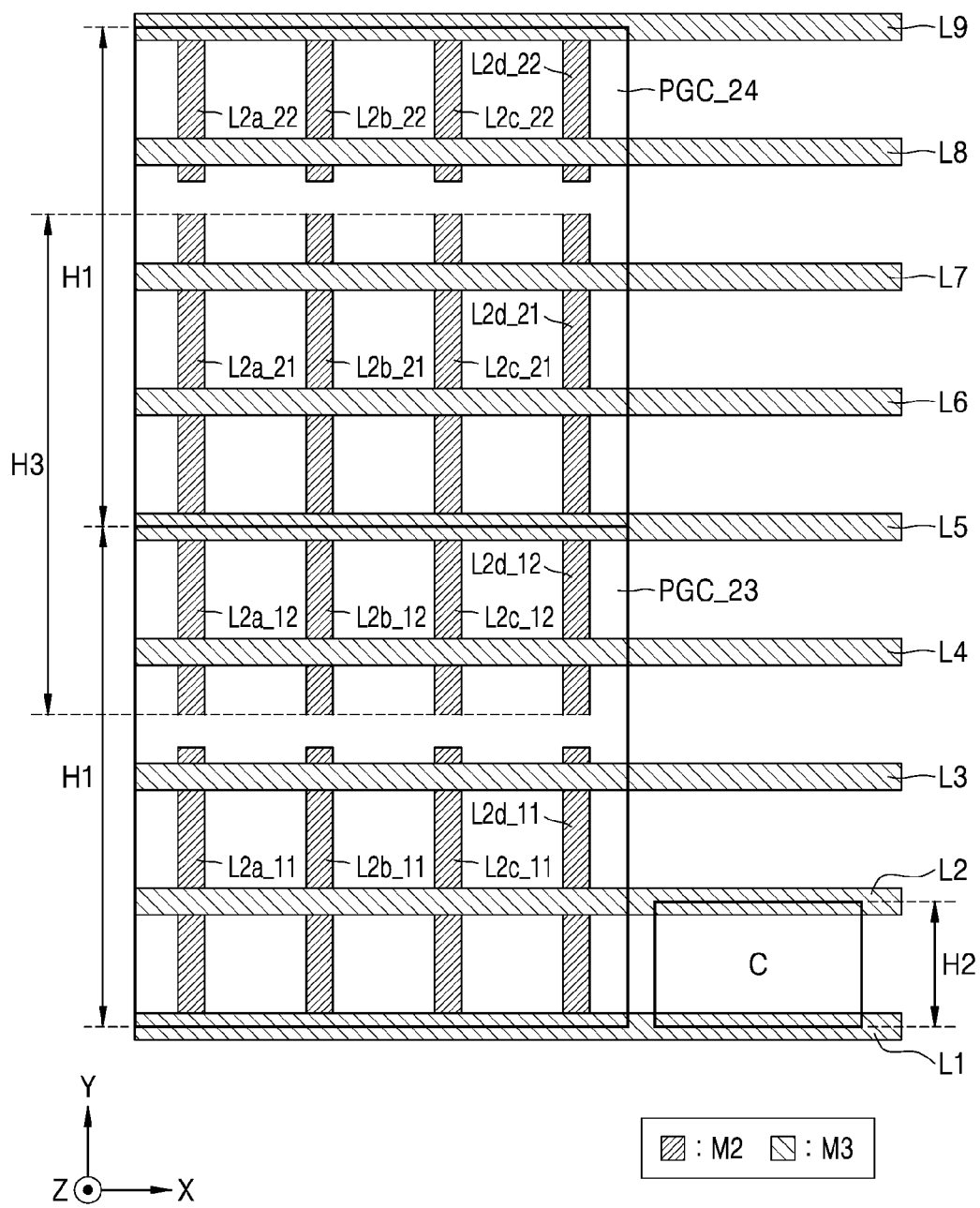
FIG. 6 is a view for explaining a structural relationship between third and fourth power gating cells of FIG. 4 and a standard cell.

FIG. 6 is a view for explaining a structural relationship between the third and fourth power gating cells PGC_23 and PGC_24 of FIG. 4 and the standard cell C. FIG. 6 is a plan view of the third power gating cell PGC_23 and the fourth power gating cell PGC_24, and a structure of the layers M1 of the third and fourth power gating cells PGC_23 and PGC_24 is omitted.

Referring to FIG. 6, each of the third and fourth power gating cells PGC_23 and PGC_24 may include the layers M2 and M3, and may include patterns formed on the layers M2 and M3 in order to supply power to standard cells via power gating control. In detail, the third power gating cell PGC_23 may include portions of conductive lines L1 through L5 formed in the X-axis direction in the layer M3 and included in power rails, and conductive lines L2a_11 through L2d_11 and L2a_12 through L2d_12 formed in the Y-axis direction in the layer M2 to reduce a resistance and a capacitance. The conductive lines L2a_11 through L2d_11 may be spaced a predetermined distance apart from the conductive lines L2a_12 through L2d_12, respectively, in the Y-axis direction.

The fourth power gating cell PGC_24 may include portions of conductive lines L5 through L9 formed in the X-axis direction in the layer M3 and included in power rails, and conductive lines L2a_21 through L2d_21 and L2a_22 through L2d_22 formed in the Y-axis direction in the layer M2 to reduce a resistance and a capacitance. The conductive lines L2a_22 through L2d_22 may be spaced a predetermined distance apart from the conductive lines L2a_21 through L2d_21, respectively, in the Y-axis direction.

The conductive lines L2a_12 through L2d_12 of the third power gating cell PGC_23 may be coupled with the conductive lines L2a_21 through L2d_21 of the fourth power gating cell PGC_24, respectively. According to an embodiment, a third length H3 in the Y-axis direction of the conducive lines L2a_12 and L2a_21 may correspond to at least four times the second length H2 of the standard cell C. However, this is merely an example embodiment, and the disclosure is not limited thereto. The third length H3 may be n times the second length H2. As such, the third power gating cell PGC_23 and the fourth power gating cell PGC_24 may be electrically coupled with each other due to coupling of the conductive lines L2a_12 through L2d_12 and L2a_21 through L2d_21 formed in the layer M2.

FIGS. 7 through 10 are views for explaining implementations of first through fourth conductive lines La_1 through Ld_1, first through third conductive lines La_2 through Lc_2, first through fourth conductive lines La_3 through Ld_3, and first through fourth conductive lines La_41 through La_44, respectively, formed in the layers M2 of power gating cell groups PGCG_1 through PGCG_4, respectively, according to an embodiment of the disclosure. The illustrations of the power gating cell groups PGCG_1 through PGCG_4 described below are merely example embodiments, and the disclosure is not limited thereto. The number of power gating cells included in the power gating cell groups PGCG_1 through PGCG_4 and a pattern of the conductive lines formed in the layer M2 may vary.

Figure 7:
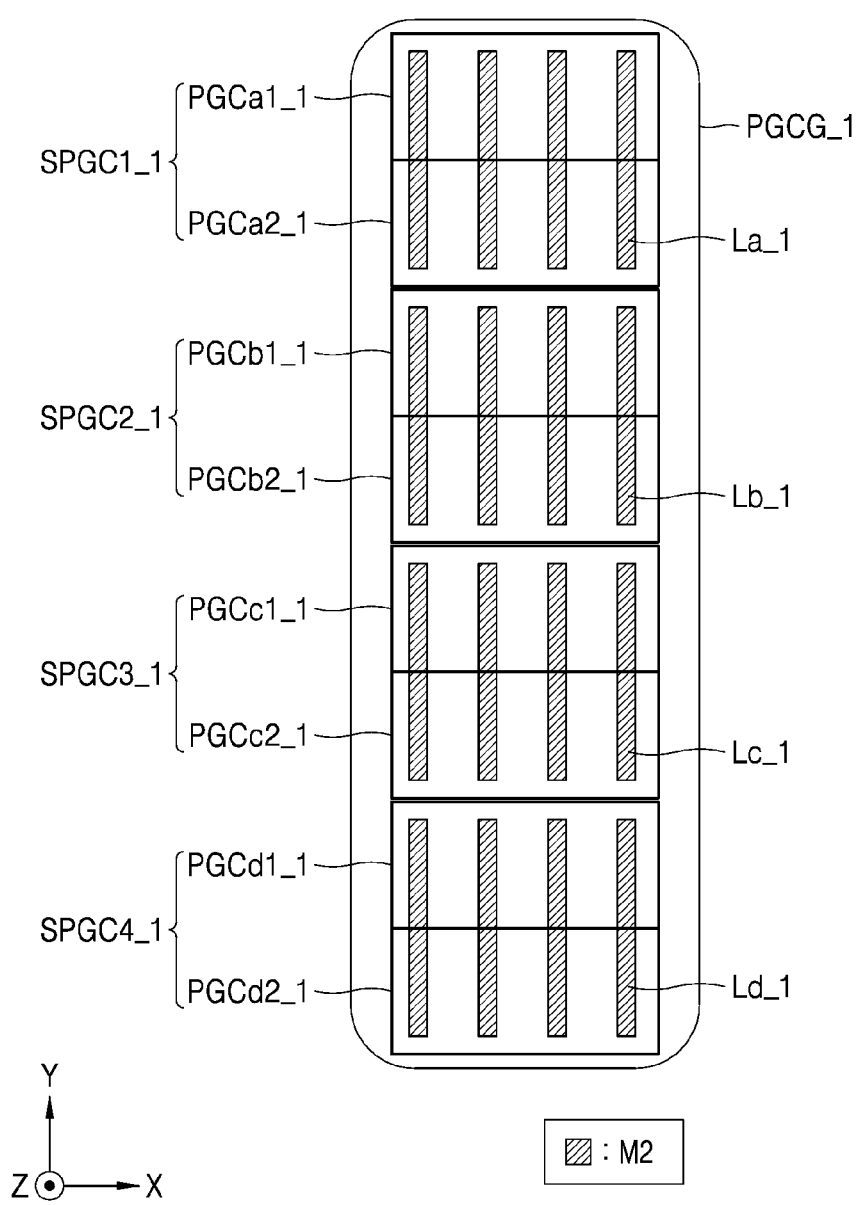
FIGS. 7 through 10 are views for explaining implementations of conductive lines formed in layers M2 of power gating cell groups, respectively, according to an embodiment of the disclosure.

Referring to FIG. 7, the power gating cell group PGCG_1 may include first through fourth superpower gating cells SPGC1_1 through SPGC4_1. The first superpower gating cell SPGC1_1 may include first and second power gating cells PGCa1_1 and PGCa2_1, and the first conductive lines La_1 may be formed in the Y-axis direction in the layers M2 of the first and second power gating cells PGCa1_1 and PGCa2_1. The second superpower gating cell SPGC2_1 may include third and fourth power gating cells PGCb1_1 and PGCb2_1, and the second conductive lines Lb_1 may be formed in the Y-axis direction in the layers M2 of the third and fourth power gating cells PGCb1_1 and PGCb2_1. The third superpower gating cell SPGC3_1 may include fifth and sixth power gating cells PGCc1_1 and PGCc2_1, and the third conductive lines Lc_1 may be formed in the Y-axis direction in the layers M2 of the fifth and sixth power gating cells PGCc1_1 and PGCc2_1. The fourth superpower gating cell SPGC4_1 may include seventh and eighth power gating cells PGCd1_1 and PGCd2_1, and the fourth conductive lines Ld_1 may be formed in the Y-axis direction in the layers M2 of the seventh and eighth power gating cells PGCd1_1 and PGCd2_1. A length in the Y-axis direction of the first through fourth conductive lines La_1 through Ld_1 may be a predetermined multiple of a length (or height) in the Y-axis direction of a standard cell. The first through fourth conductive lines La_1 through Ld_1 may be spaced apart from each other in the Y-axis direction at regular intervals. The first conductive lines La_1 of the layer M2 of the first power gating cell PGCa1_1 arranged the most adjacent to the top boundary of the power gating cell group PGCG_1 may each extend limitedly to a point that is a predetermined distance away from the top boundary in the Y-axis direction. The fourth conductive lines Ld_1 of the layer M2 of the eighth power gating cell PGCd2_1 arranged the most adjacent to the bottom boundary of the power gating cell group PGCG_1 may each extend limitedly to a point that is a predetermined distance away from the bottom boundary in the Y-axis direction.

As described above, the first conductive lines La_1 may each extend from a point a predetermined distance away from the top boundary of the first power gating cell PGCa1_1 in the first superpower gating cell SPGC1_1 in the Y-axis direction to a point a predetermined distance away from the bottom boundary of the second power gating cell PGCa2_1 in the Y-axis direction. The structure of the first superpower gating cell SPGC1_1 is applicable to structures of the second through fourth superpower gating cells SPGC2_1 through SPGC4_1.

Figure 8:
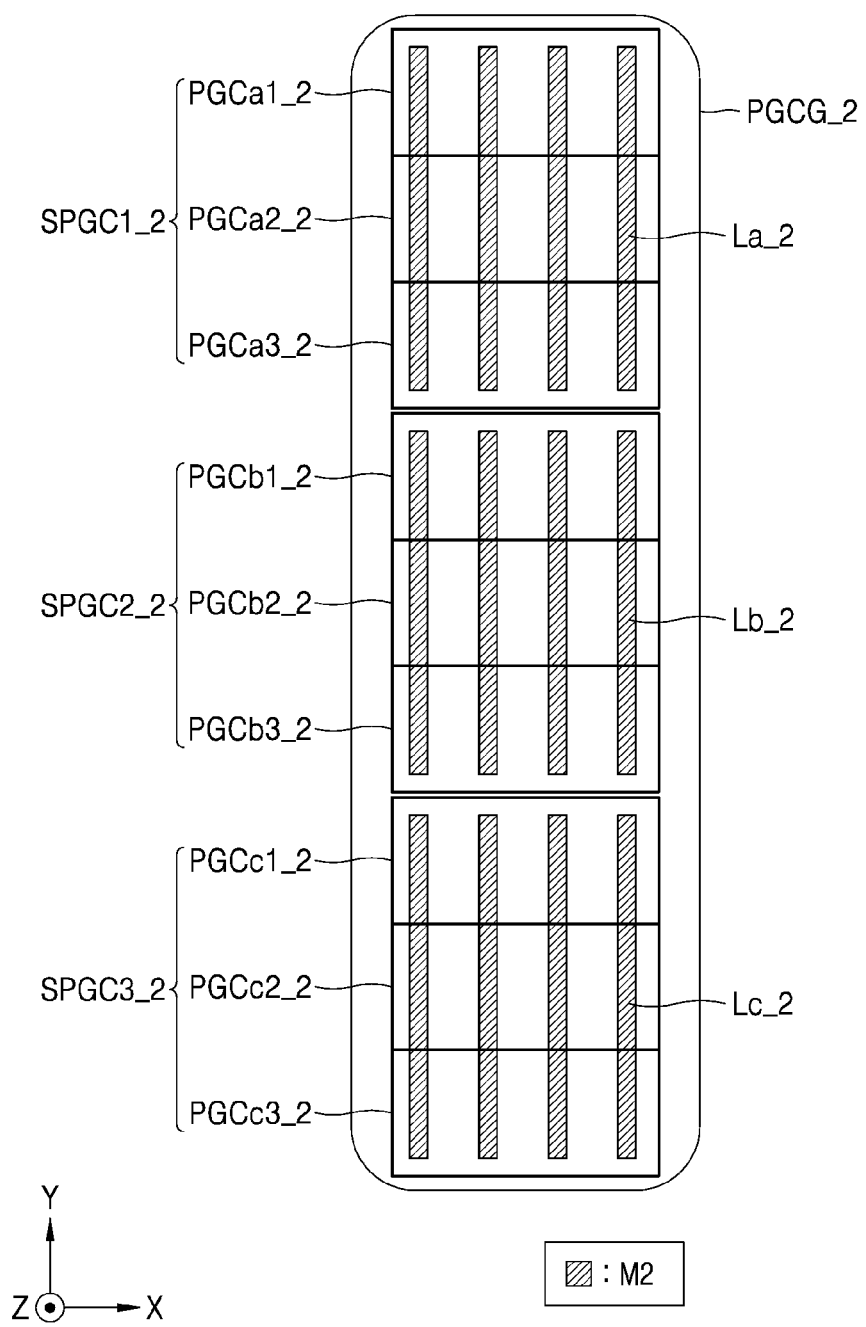

Referring to FIG. 8, the power gating cell group PGCG_2 may include first through third superpower gating cells SPGC1_2 through SPGC3_2. The first superpower gating cell SPGC1_2 may include first through third power gating cells PGCa1_2 through PGCa3_2, and the first conductive lines La_2 may be formed in the Y-axis direction in the layers M2 of the first through third power gating cells PGCa1_2 through PGCa3_2. The second superpower gating cell SPGC2_2 may include fourth through sixth power gating cells PGCb1_2 through PGCb3_2, and the second conductive lines Lb_2 may be formed in the Y-axis direction in the layers M2 of the fourth through sixth power gating cells PGCb1_2 through PGCb3_2. The third superpower gating cell SPGC3_2 may include seventh through ninth power gating cells PGCc1_2 through PGCc3_2, and the third conductive lines Lc_2 may be formed in the Y-axis direction in the layers M2 of the seventh through ninth power gating cells PGCc1_2 through PGCc3_2. A length in the Y-axis direction of each of the first through third conductive lines La_2 through Lc_2 may be greater than that in the Y-axis direction of each of the first through fourth conductive lines La_1 through Ld_1 of FIG. 7. The first through third conductive lines La_2 through Lc_2 may be spaced apart from each other in the Y-axis direction at regular intervals. The first conductive lines La_2 of the layer M2 of the first power gating cell PGCa1_2 arranged the most adjacent to the top boundary of the power gating cell group PGCG_2 may each extend limitedly to a point that is a predetermined distance away from the top boundary in the Y-axis direction. The third conductive lines Lc_2 of the layer M2 of the ninth power gating cell PGCc2_2 arranged the most adjacent to the bottom boundary of the power gating cell group PGCG_1 may each extend limitedly to a point that is a predetermined distance away from the bottom boundary in the Y-axis direction.

As described above, the first conductive lines La_2 may each extend from a point a predetermined distance away from the top boundary of the first power gating cell PGCa1_2 in the first superpower gating cell SPGC1_2 in the Y-axis direction to a point a predetermined distance away from the bottom boundary of the second power gating cell PGCa1_2 in the Y-axis direction. The structure of the first superpower gating cell SPGC1_2 is applicable to structures of the second and third superpower gating cells SPGC2_-2 and SPGC3_2. According to embodiments, the first through third superpower gating cells SPGC1_2 through SPGC3_2 may be implemented to include more power gating cells than the three power gating cells illustrated in FIG. 8, and may be implemented to include conductive lines formed longer in the layer M2 in the Y-axis direction than those illustrated in FIG. 8.

Figure 9:
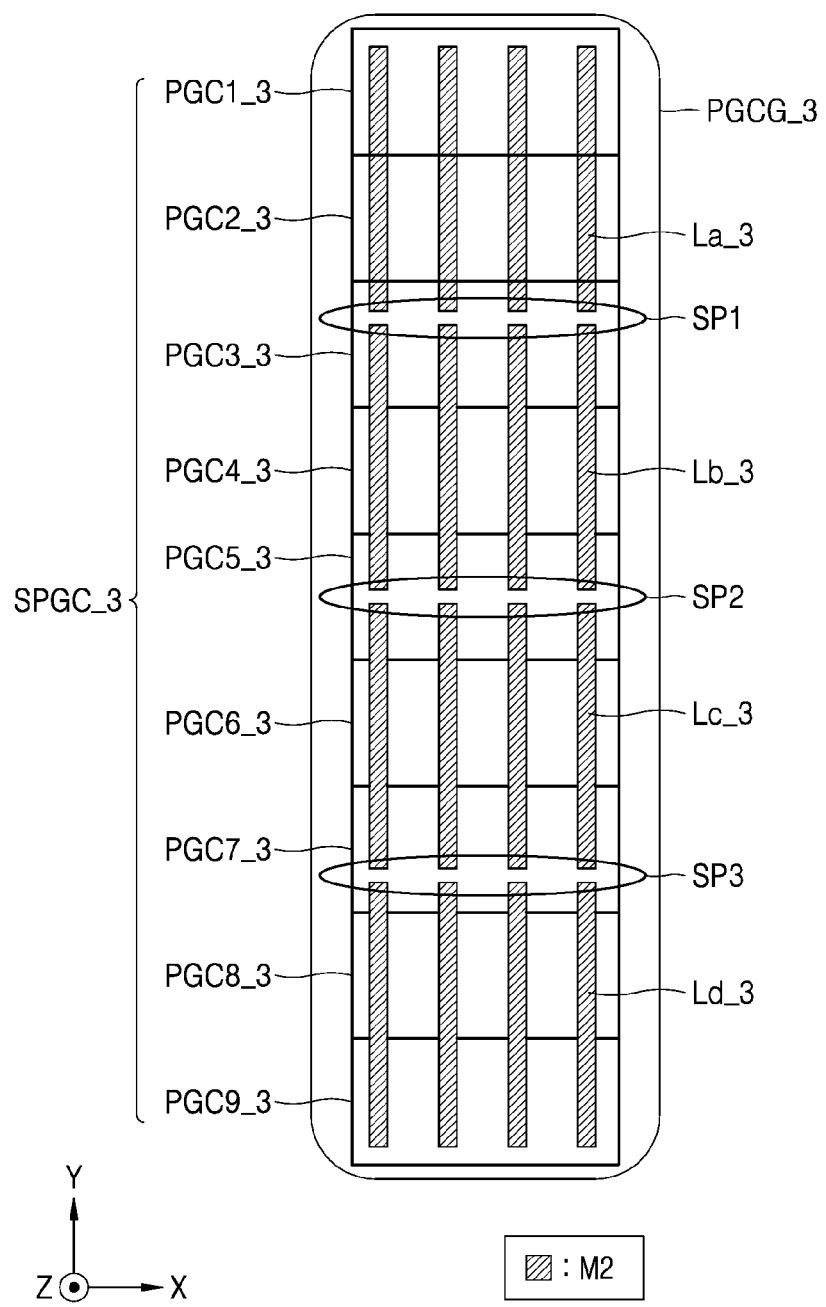

Referring to FIG. 9, the power gating cell group PGCG_3 may include first through ninth power gating cells PGC1_3 through PGC9_3. In the layers M2 of the first through third power gating cells PGC1_3 through PGC3_3, the first conductive lines La_3 may be formed in the Y-axis direction. In the layers M2 of the third through fifth power gating cells PGC3_3 through PGC5_3, the second conductive lines Lb_3 may be formed in the Y-axis direction. The third power gating cell PGC3_3 may include a space SP1 of the layer M2 formed by spacing the first conductive lines La_3 and the second conductive lines Lb_3 apart from each other. In the layers M2 of the fifth through seventh power gating cells PGC5_3 through PGC7_3, the third conductive lines Lc_3 may be formed in the Y-axis direction. The fifth power gating cell PGC5_3 may include a space SP2 of the layer M2 formed by spacing the second conductive lines Lb_3 and the third conductive lines Lc_3 apart from each other. In the layers M2 of the seventh through ninth power gating cells PGC7_3 through PGC9_3, the fourth conductive lines Ld_3 may be formed in the Y-axis direction. The seventh power gating cell PGC7_3 may include a space SP3 of the layer M2 formed by spacing the third conductive lines Lc_3 and the fourth conductive lines Ld_3 apart from each other.

As described above, the first conductive lines La_3 of the layer M2 of the first power gating cell PGC1_3 arranged the most adjacent to the top boundary of the power gating cell group PGCG_3 may each extend limitedly to a point that is a predetermined distance away from the top boundary in the Y-axis direction. The fourth conductive lines Ld_3 of the layer M2 of the ninth power gating cell PGC9_3 arranged the most adjacent to the bottom boundary of the power gating cell group PGCG_3 may each extend in the Y-axis direction limitedly to a point that is a predetermined distance away from the bottom boundary in the Y-axis direction. When the particular power gating cells PGC3_3, PGC5_3, and PGC7_3 include the spaces SP1, SP2, and SP3 between the conductive lines La_3, Lb_3, Lc_3, and Ld_3, the power gating cell group PGCG_3 may be referred to as a superpower gating cell SPGC_3.

Figure 10:
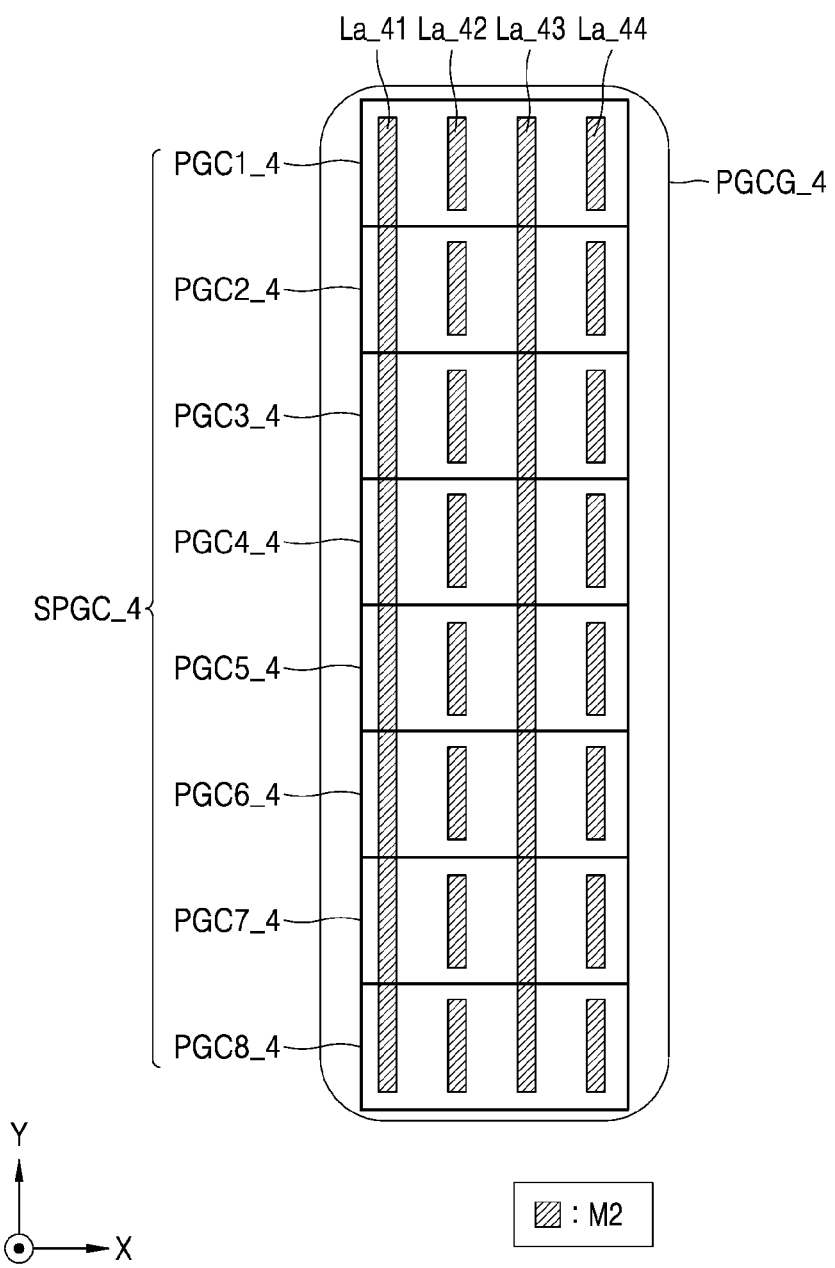

Referring to FIG. 10, the power gating cell group PGCG_4 may include first through eighth power gating cells PGC1_4 through PGC8_4. The first conductive line La_41 and the third conductive line La_43 may be formed in the Y-axis direction in the layers M2 of the first through eighth power gating cells PGC1_4 through PGC8_4, and a second conductive line La_42 and a fourth conductive line La_44 may be formed in the Y-axis direction in the layer M2 of each of the first through eighth power gating cells PGC1_4 through PGC8_4. In other words, the first through fourth conductive lines La_41 through La_44 having different patterns may be formed in the layer M2 of the power gating cell group PGCG_4. However, this is merely an example embodiment, and the disclosure is not limited thereto. Various patterns of conductive lines may be formed in the layer M2 in the Y-axis direction such that resistance and capacitance of an integrated circuit including the power gating cell group PGCG_4 may be reduced. In this case, the power gating cell group PGCG_4 may be referred to as a superpower gating cell SPGC_4.

Figure 11A:
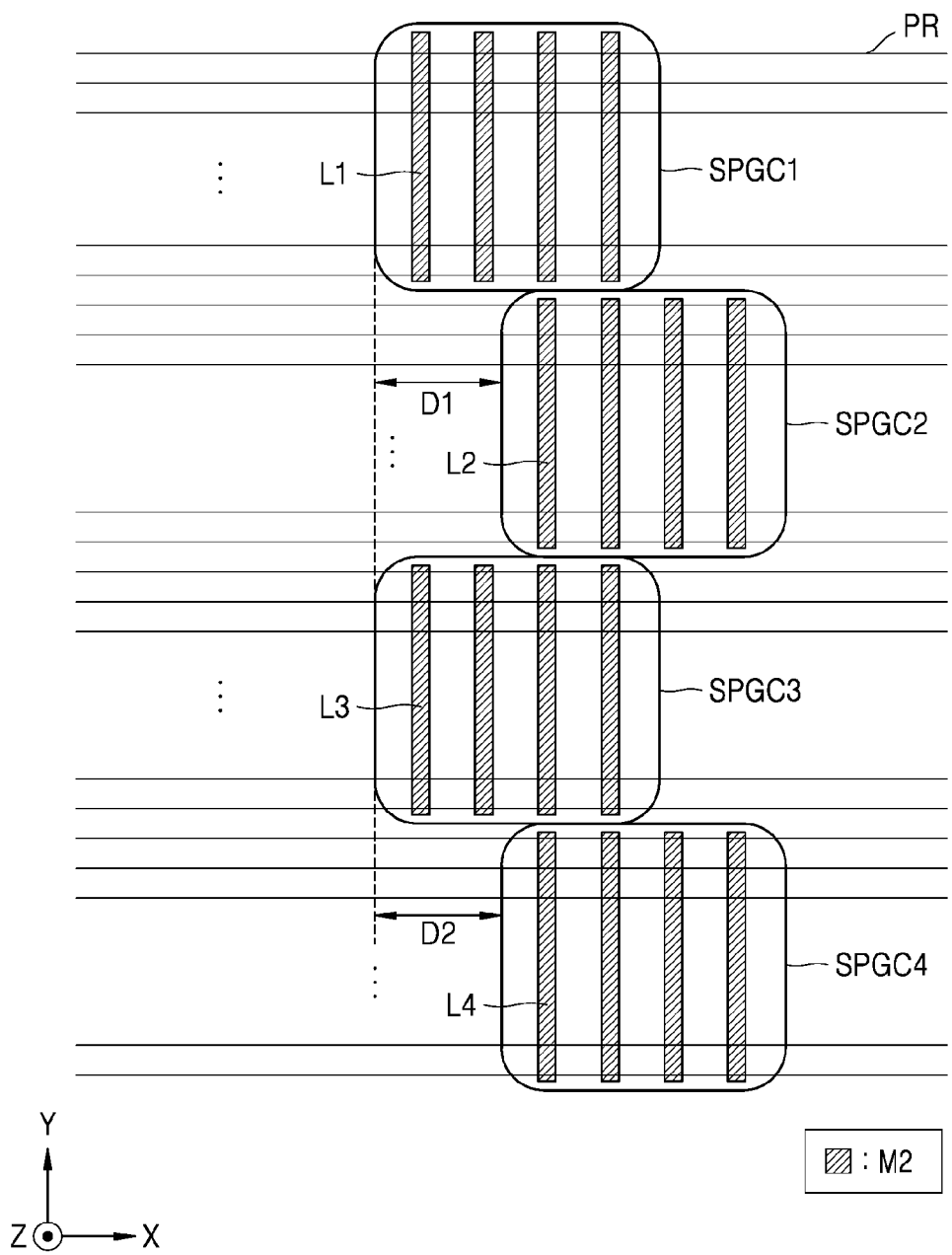
FIGS. 11A and 11B are views for explaining layout embodiments of power gating cell groups according to an embodiment of the disclosure.
Figure 11B:
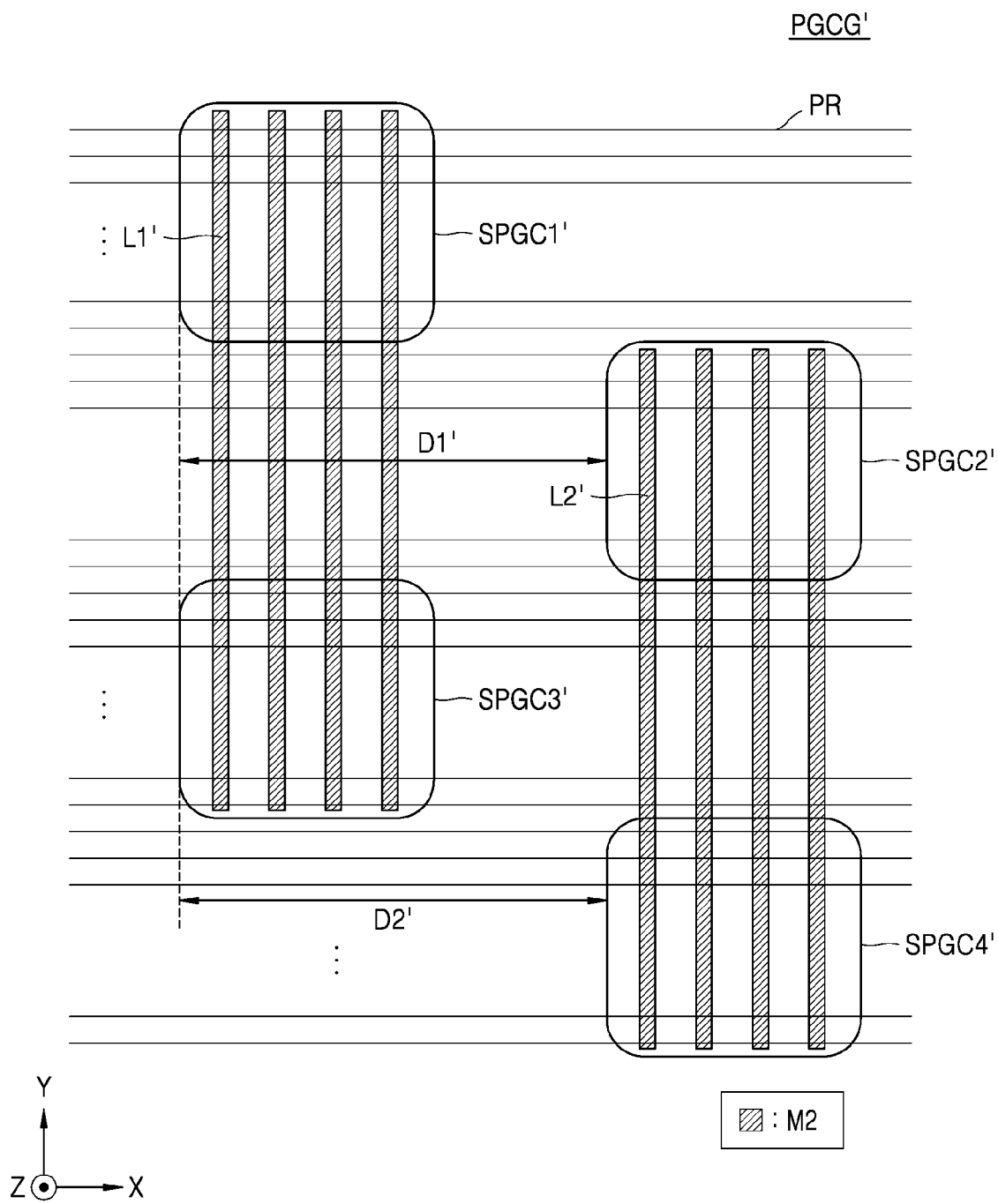

FIGS. 11A and 11B are view for explaining layout embodiments of power gating cell groups PGCG and PGCG' according to an embodiment of the disclosure.

Referring to FIG. 11A, the power gating cell group PGCG may include first through fourth superpower gating cells SPGC1 through SPGC4. The first superpower gating cell SPGC1 may be coupled with power rails PR each extending in the X-axis direction, and may include conductive lines L1 each extending in the Y-axis direction in the layer M2. The second superpower gating cell SPGC2 may be coupled with power rails PR each extending in the X-axis direction, and may include conductive lines L2 each extending in the Y-axis direction in the layer M2. The third superpower gating cell SPGC3 may be coupled with power rails PR each extending in the X-axis direction, and may include conductive lines L3 each extending in the Y-axis direction in the layer M2. The fourth superpower gating cell SPGC4 may be coupled with power rails PR each extending in the X-axis direction, and may include conductive lines L4 each extending in the Y-axis direction in the layer M2.

The second superpower gating cell SPGC2 may be arranged below the first superpower gating cell SPGC1 in the Y-axis direction, and a left boundary of the second superpower gating cell SPGC2 may be spaced a first distance D1 apart from an extension of a left boundary of the first superpower gating cell SPGC1. The third superpower gating cell SPGC3 may be arranged below the second superpower gating cell SPGC2 in the Y-axis direction, and a left boundary of the third superpower gating cell SPGC3 may be aligned with the extension of the left boundary of the first superpower gating cell SPGC1. The fourth superpower gating cell SPGC4 may be arranged below the third superpower gating cell SPGC3 in the Y-axis direction, and a left boundary of the fourth superpower gating cell SPGC4 may be spaced a second distance D2 apart from an extension of the left boundary of the third superpower gating cell SPGC3.

The first distance D1 and the second distance D2 may be the same as each other or different from each other. According to embodiments, the first through fourth superpower gating cells SPGC1 through SPGC4 may be arranged such that respective boundaries thereof partially contact each other or the respective boundaries do not contact each other.

Referring to FIG. 11B, the power gating cell group PGCG' may include first through fourth superpower gating cells SPGC1' through SPGC4'. The first and third superpower gating cells SPGC1' and SPGC3' may be coupled with power rails PR each extending in the X-axis direction, and may include respective portions of conductive lines L1' each extending in the Y-axis direction in the layer M2. In other words, the conductive lines L1' may each extend over the first superpower gating cell SPGC1' and the third superpower gating cell SPGC3'. The second and fourth superpower gating cells SPGC2' and SPGC4' may be coupled with power rails PR each extending in the X-axis direction, and may include respective portions of conductive lines L2' each extending in the Y-axis direction in the layer M2. In other words, the conductive lines L2' may each extend over the second superpower gating cell SPGC2' and the fourth superpower gating cell SPGC4'.

The second superpower gating cell SPGC2' may be arranged below the first superpower gating cell SPGC1' in the Y-axis direction, and a left boundary of the second superpower gating cell SPGC2' may be spaced a first distance D1' apart from an extension of a left boundary of the first superpower gating cell SPGC1'. The third superpower gating cell SPGC3' may be arranged below the second superpower gating cell SPGC2' in the Y-axis direction, and a left boundary of the third superpower gating cell SPGC3' may be aligned with the extension of the left boundary of the first superpower gating cell SPGC1'. The fourth superpower gating cell SPGC4' may be arranged below the third superpower gating cell SPGC3' in the Y-axis direction, and a left boundary of the fourth superpower gating cell SPGC4' may be spaced a second distance D2' apart from an extension of the left boundary of the third superpower gating cell SPGC3'. The first distance D1' and the second distance D2' may be the same as each other or different from each other.

Figure 12:
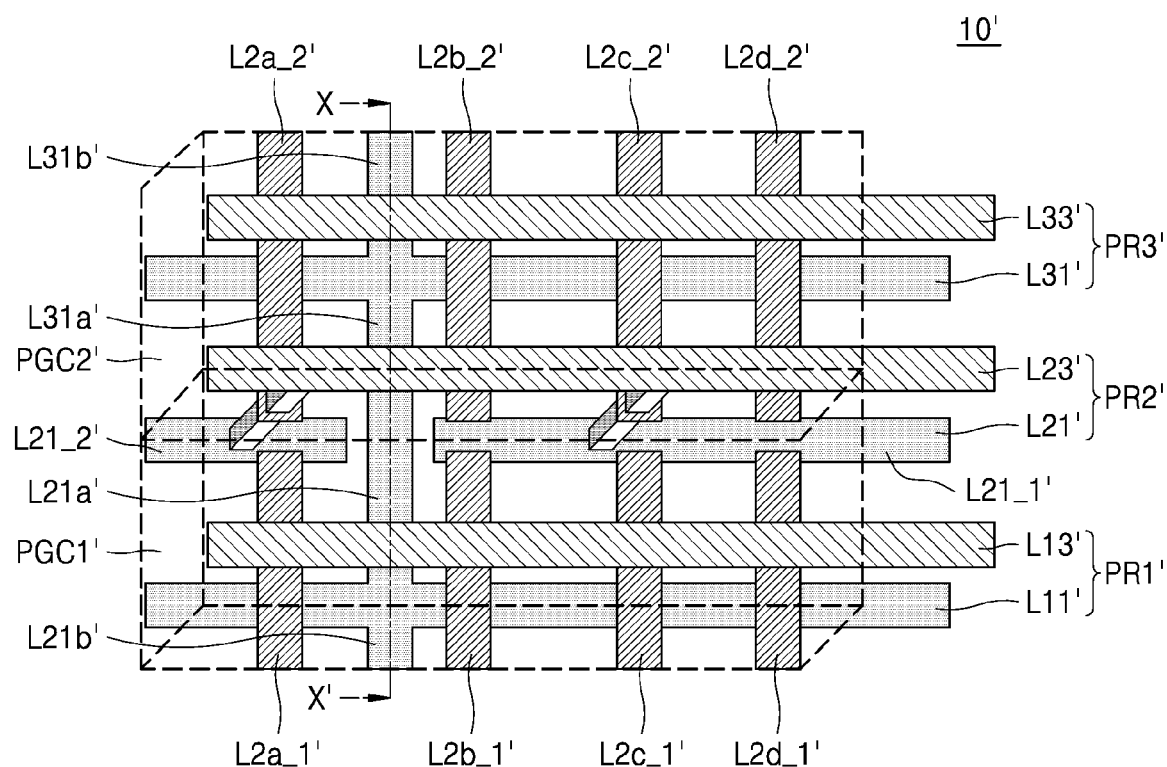
FIG. 12 is a view illustrating a portion of an integrated circuit according to an embodiment of the disclosure.

FIG. 12 is a view illustrating a portion of an integrated circuit 10' according to an embodiment of the disclosure. A description of the integrated circuit 10' that is the same as that of the integrated circuit 10 of FIG. 1 will not be provided herein, and a description of the integrated circuit 10' that is different from that of the integrated circuit 10 of FIG. 1 will be focused on and provided herein.

Referring to FIG. 12, the integrated circuit 10' may include first and second power gating cells PGC1' and PGG2' for supplying power via power rails PR1', PR2', and PR3'. The first power gating cell PGC1' may include respective portions of conductive lines L11' and L13' in the X-axis direction that supply a certain voltage to the power rail PR1', and may include respective portions of conductive lines L21' and L23' in the X-axis direction that supply a certain voltage to the power rail PR2'. The conductive line L21' indicates a conductive line including a conductive line L21_1' and a conductive line L21_2'. The second power gating cell PGC2' may include the respective portions of the conductive lines L21_1' and L23' in the X-axis direction that supply a certain voltage to the power rail PR2', and may include respective portions of conductive lines L31' and L33' in the X-axis direction that supply a certain voltage to the power rail PR3'. A description will now be given on the premise that, as described above with reference to FIG. 1, a positive supply voltage (for example, the second voltage) is applied to the power rails PR1' and PR3' and a negative supply voltage (for example, the ground voltage) is applied to the power rail PR2'. However, this is merely an example embodiment, and the disclosure is not limited thereto. The negative supply voltage (for example, the ground voltage) may be applied to the power rails PR1' and PR3', and the positive supply voltage (for example, the second voltage) may be applied to the power rail PR2'.

According to an embodiment, the first power gating cell PGC1' may further include a conductive line L21a' and a conductive line L21b' each extending in the layer M1 in the Y-axis direction. The conductive line L21a' may extend to a top boundary of the first power gating cell PGC1', and the conductive line L21b' may extend to be coupled with another conductive line (not shown) of the first power gating cell PGC1'. The other conductive line (not shown) of the first power gating cell PGC1' extends in the layer M1 in the X-axis direction, and accordingly may be a conductive line included in another power rail arranged below the power rail PR1' in the Y-axis direction to transmit a positive supply voltage to standard cells.

The second power gating cell PGG2' may further include a conductive line L31a' and a conductive line L31b' each extending in the layer M1 in the Y-axis direction. The conductive line L31a' may extend to a bottom boundary of the second power gating cell PGG2', and the conductive line L31b' may extend to be coupled with another conductive line (not shown) of the second power gating cell PGC2'. The other conductive line (not shown) of the second power gating cell PGG2' extends in the layer M1 in the X-axis direction, and accordingly may be a conductive line included in another power rail arranged above the power rail PR3' in the Y-axis direction to transmits a positive supply voltage to standard cells.

According to an embodiment, the first power gating cell PGC1' and the second power gating cell PGG2' may be stacked on each other, and at the same time the conductive lines L21a' and L31a' formed in the layer M1 may be coupled with each other. In other words, the conductive line L11' and the conductive line L31' may be electrically coupled with each other via the conductive line L21a' and the conductive line L31a', and the conductive line L21_1' and the conductive line L21_2' may be spaced a predetermined distance apart from each other in the X-axis direction in order to secure a space where the conductive line L21a' is to extend in the Y-axis direction. The first power gating cell PGC1' and the second power gating cell PGG2' may be electrically coupled with each other via patterns of conductive lines formed in the layer M1. This structure is applicable to other power gating cells (not shown) included in the integrated circuit 10', and accordingly, resistance and capacitance of the integrated circuit 10' may be reduced. The conductive lines L21_1' and L21_2' may be electrically coupled with each other through vias, conductive lines in the layer M2 (for example, conductive lines L2a_2' and L2c_2') and a conductive line in the layer M3 (for example, the conductive line L23').

The first power gating cell PGC1' may further include conductive lines L2a_1' through L2d_1' each extending in the layer M2 in the Y-axis direction. The second power gating cell PGC2' may further include conductive lines L2a_2' through L2d_2' each extending in the layer M2 in the Y-axis direction. The conductive lines L2a_1' through L2d_1' may each extend from a point a predetermined distance away from the top boundary of the first power gating cell PGC1' to a point a predetermined distance away from the bottom boundary of the first power gating cell PGC1', and the conductive lines L2a_2' through L2d_2' may each extend from a point a predetermined distance away from the top boundary of the second power gating cell PGC2' to a point a predetermined distance away from the bottom boundary of the second power gating cell PGC2'. In other words, the conductive lines L2a_1' through L2d_1' may not be coupled with the conductive lines L2a_2' through L2d_2', and thus, a pattern of the conductive lines L2a_1' through L2d_1' and L2a_2' through L2d_2' each extending in the layer M2 of the integrated circuit 10' may be different from that of the conductive lines L2a_1 through L2d_1 and L2a_2 through L2d_2 each extending in the layer M2 of the integrated circuit 10 of FIG. 1.

Figure 13:
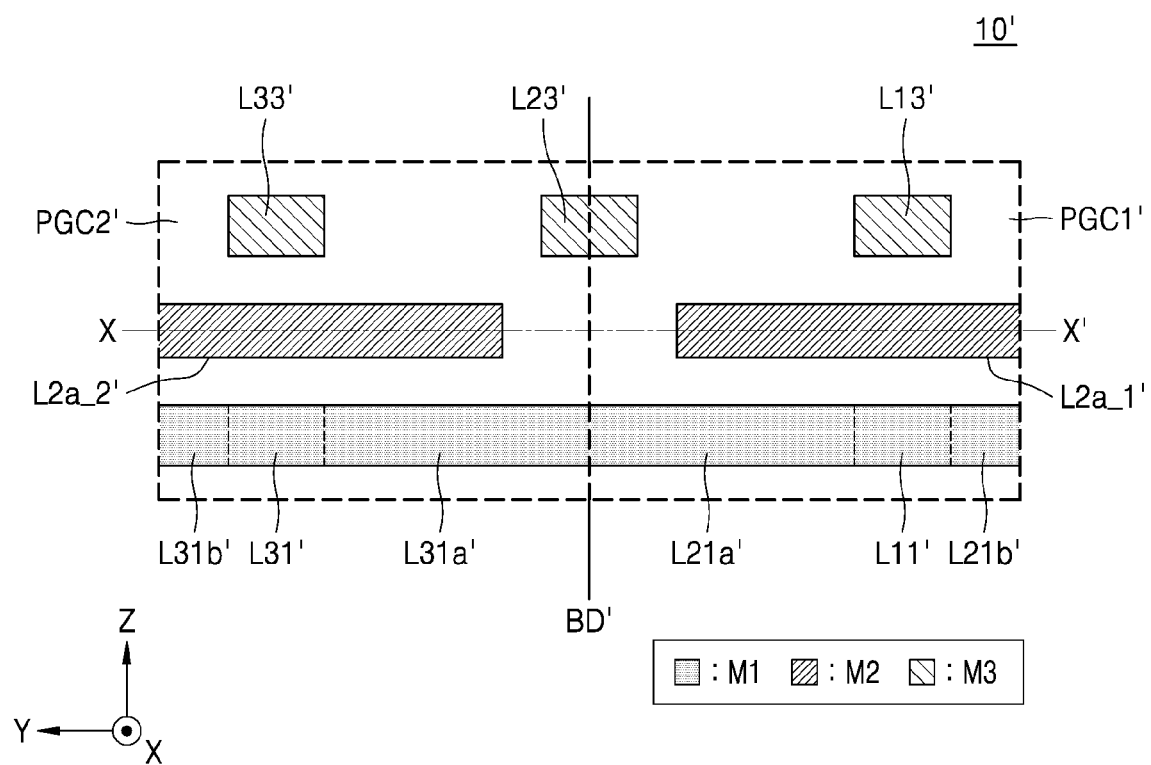
FIG. 13 is a cross-sectional view of the integrated circuit taken along line X-X' of FIG. 12 parallel to a Z-axis direction.

FIG. 13 is a cross-sectional view of the integrated circuit 10' taken along line X-X' of FIG. 12 in parallel to the Z-axis direction. For convenience of illustration, FIG. 13 illustrates only the layers M1, M2, and M3 from among the layers included in the integrated circuit 10'.

Referring to FIGS. 12 and 13, the power rail PR1' may include the conductive lines L11' and L13' each extending in the X-axis direction in the first power gating cell PGC1' in parallel to each other and respectively formed in the layers M1 and M3, the power rail PR2' may include the conductive lines L21' and L23' each extending in the X-axis direction in parallel to each other at a boundary BD' between the first power gating cell PGC1' and the second power gating cell PGC2' and respectively formed in the layers M1 and M3, and the power rail PR3' may include the conductive lines L31' and L33' each extending in the X-axis direction in the second power gating cell PGC2' in parallel to each other and respectively formed in the layers M1 and M3.

The conductive line L2a_1' extending in the Y-axis direction in the layer M2 of the first power gating cell PGC1' and the conductive line L2a_2' extending in the Y-axis direction in the layer M2 of the second power gating cell PGG2' may be spaced a predetermined distance apart from the boundary BD' as shown in FIG. 13.

The conductive line L11' of the power rail PR1' may be electrically coupled with the conductive line L31' of the power rail PR3' via the conductive line L21a' of the first power gating cell PGC1' and the conductive line L31a' of the second power gating cell PGG2'.

Figure 14:
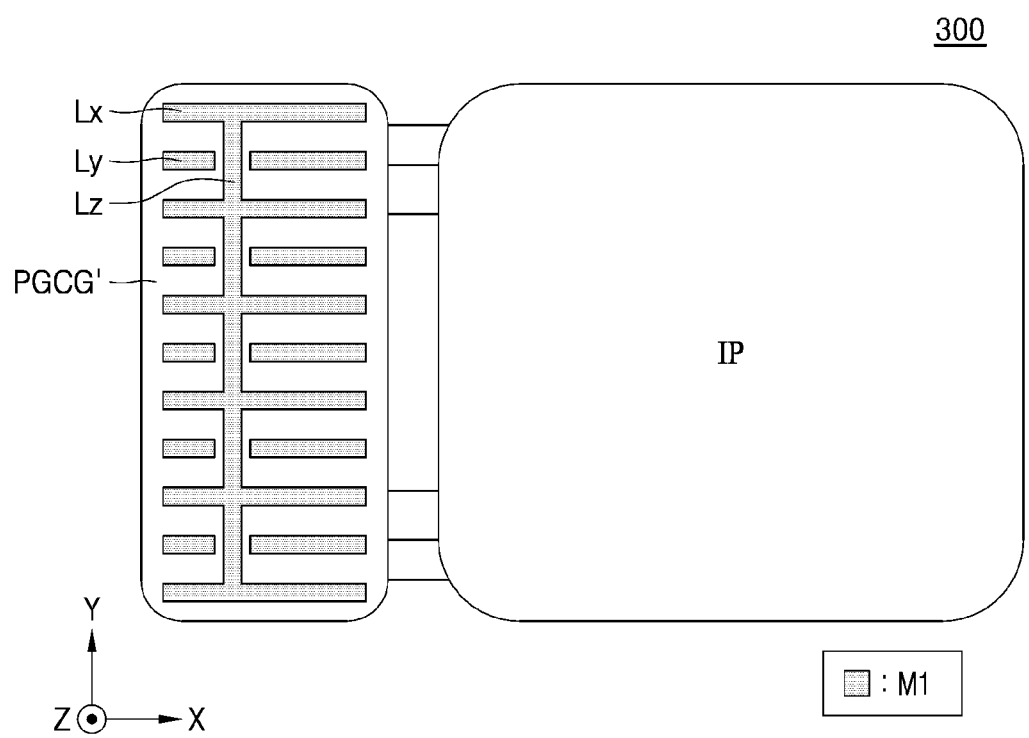
FIG. 14 is a view for explaining a power gating cell group that provides power to an intellectual property (IP) block of an integrated circuit according to an embodiment of the disclosure.

FIG. 14 is a view for explaining a power gating cell group PGCG' that provides power to an IP block IP of an integrated circuit 300 according to an embodiment of the disclosure.

Referring to FIG. 14, the integrated circuit 300 may include the power gating cell group PGCG' and the IP block IP. The power gating cell groups PGCG' may include a plurality of power gating cells. The power gating cell group PGCG' may include a plurality of first conductive lines Lx formed in the layer M1 in the X-axis direction to provide a positive supply voltage (or a negative supply voltage) to the IP block IP, a plurality of second conductive lines Ly formed in the layer M1 in the X-axis direction to provide a negative supply voltage (or a positive supply voltage) to the IP block IP, and a plurality of third conductive lines Lz each extending in the layer M1 in the Y-axis direction to couple the plurality of first conductive lines Lx. The plurality of first conductive lines Lx may be coupled with each other via the third conductive lines Lz within the power gating cell group PGCG'. In other words, the third conductive lines Lz may be limitedly formed around the top boundary and the bottom boundary of the power gating cell group PGCG' so as not to be coupled with another power gating cell group (not shown). As such, power gating cells included in the power gating cell group PGCG' are coupled with each other via the third conductive lines Lz of the layer M1, and thus the power gating cell group PGCG' may be referred to as a superpower gating cell.

Figure 15:
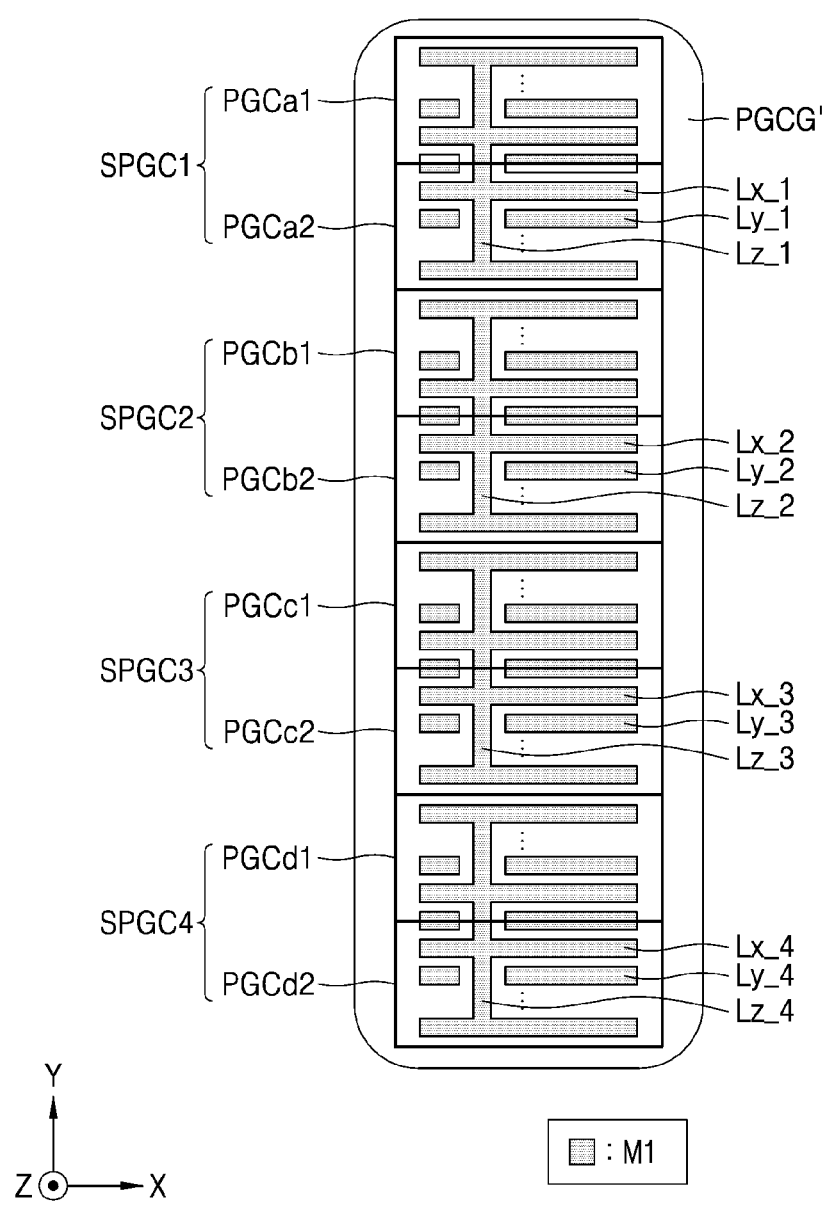
FIG. 15 is a view for explaining an implementation of conductive lines formed in a layer M1 of a power gating cell group according to an embodiment of the disclosure.

FIG. 15 is a view for explaining an implementation of first through third conductive lines Lx_1 through Lz_4 formed in the layer M1 of the power gating cell group PGCG' according to an embodiment of the disclosure.

Referring to FIG. 15, the power gating cell group PGCG' may include first through fourth superpower gating cells SPGC1 through SPGC4. The first superpower gating cell SPGC1 may include first and second power gating cells PGCa1 and PGCa2, and a first conductive line Lx_1 for providing a positive supply voltage (or a negative supply voltage) to the IP block, a second conductive line Ly_1 for providing a negative supply voltage (or a positive supply voltage) to the IP block, and a third conductive line Lz_1 coupled to the first conductive line Lx_1 may be included in the layers M1 of the first and second power gating cells PGCa1 and PGCa2. The second superpower gating cell SPGC2 may include third and fourth power gating cells PGCb1 and PGCb2, and a first conductive line Lx_2 for providing a positive supply voltage (or a negative supply voltage) to the IP block, a second conductive line Ly_2 for providing a negative supply voltage (or a positive supply voltage) to the IP block, and a third conductive line Lz_2 coupled to the first conductive line Lx_2 may be included in the layers M1 of the third and fourth power gating cells PGCb1 and PGCb2. The third superpower gating cell SPGC3 may include fifth and sixth power gating cells PGCc1 and PGCc2, and a first conductive line Lx_3 for providing a positive supply voltage (or a negative supply voltage) to the IP block, a second conductive line Ly_3 for providing a negative supply voltage (or a positive supply voltage) to the IP block, and a third conductive line Lz_3 coupled to the first conductive line Lx_3 may be included in the layers M1 of the fifth and sixth power gating cells PGCc1 and PGCc2. The fourth superpower gating cell SPGC4 may include seventh and eighth power gating cells PGCd1 and PGCd2, and a first conductive line Lx_4 for providing a positive supply voltage (or a negative supply voltage) to the IP block, a second conductive line Ly_4 for providing a negative supply voltage (or a positive supply voltage) to the IP block, and a third conductive line Lz_4 coupled to the first conductive line Lx_4 may be included in the layers M1 of the seventh and eighth power gating cells PGCd1 and PGCd2.

In other words, in the power gating cell group PGCG' according to an embodiment of the disclosure, the third conductive lines Lz_1 through Lz_4 may extend limitedly at the top boundaries and the bottom boundaries of the superpower gating cells SPGC1 through SPGC4.

However, FIG. 15 is merely an example embodiment, and the disclosure is not limited thereto. According to embodiments, the power gating cell group PGCG' may include more or less superpower gating cells than those of FIG. 15, and each of the first through fourth superpower gating cells SPGC1 through SPGC4 may include more or less power gating cells than those of FIG. 15.

Figure 16:
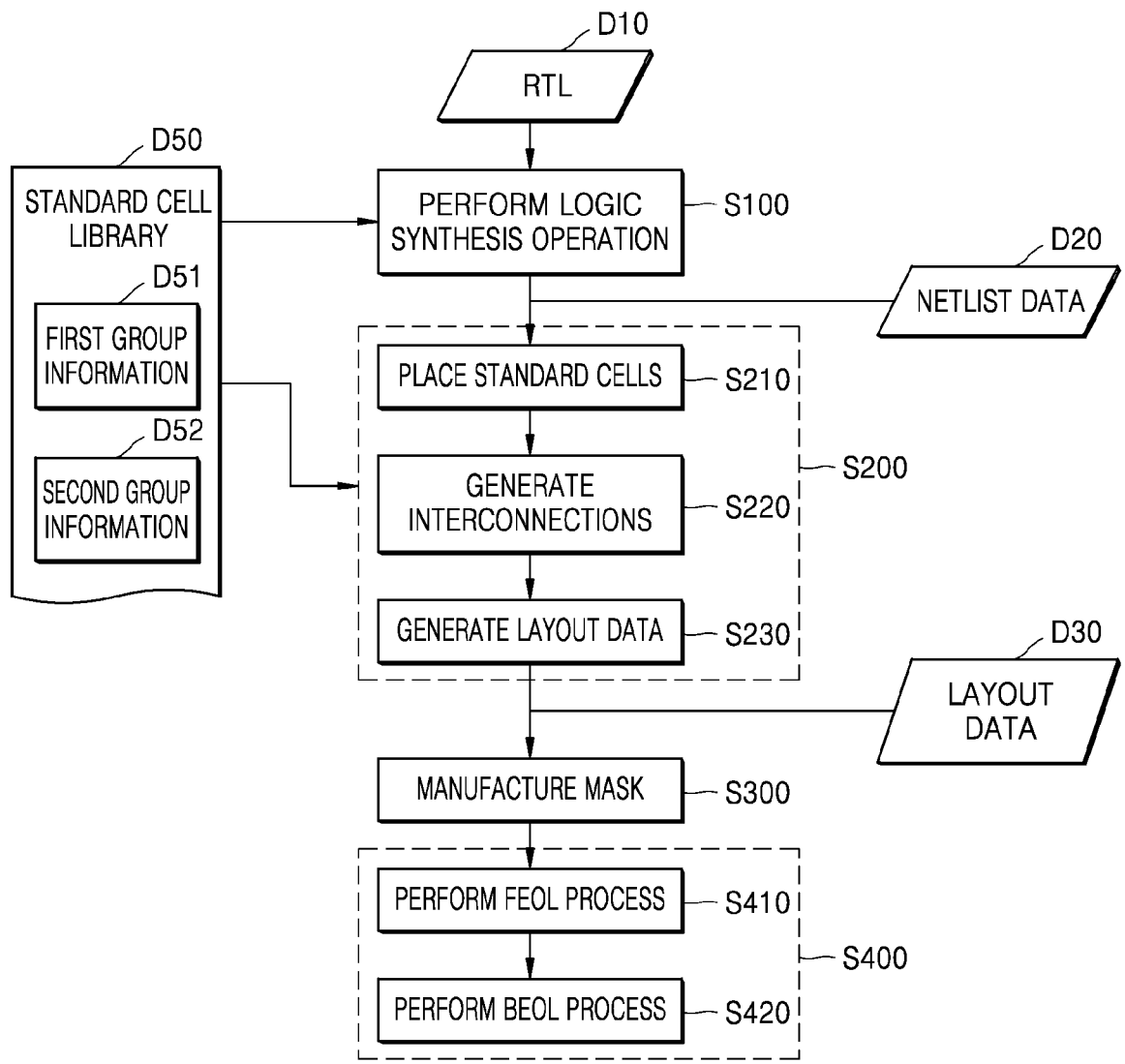
FIG. 16 is a flowchart of a method of fabricating an integrated circuit including a plurality of standard cells, according to an embodiment of the disclosure.

FIG. 16 is a flowchart of a method of fabricating an integrated circuit including a plurality of standard cells, according to an embodiment of the disclosure.

A standard cell library D50 may include information about the plurality of standard cells, for example, function information, characteristic information, layout information, and the like. As shown in FIG. 16, the standard cell library D50 may include at least one of first group information D51 and second group information D52. The first group information D51 may include information about power gating cells in which conductive lines each extending in the layer M2 in the Y-axis direction are coupled with each other, as described above with reference to FIG. 1, and the second group information D52 may include information about power gating cells in which conductive lines for supplying power to standard cells are coupled with each other via conductive lines each extending in the layer M2 in the Y-axis direction, as described above with reference to FIG. 13.

Referring to FIG. 16, in operation S100, a logic synthesis operation may be performed to generate netlist data D20 from RTL data D10. For example, a semiconductor design tool (for example, a logic synthesis tool) may generate netlist data D20 including a bitstream or a netlist from RTL data D10 written in a Hardware Description Language (HDL) such as VHSIC Hardware Description Language (VHDL), by performing a logic synthesis with reference to the standard cell library D50. As described above, information (i.e., D51 or D52) about power gating cells coupled with each other via the layer M2 or information about power gating cells coupled with each other via the layer M1 may be included in the standard cell library D50, and the standard cells may be included in the integrated circuit with reference to this information during the logic synthesis.

In operation S200, a place & routing (P&R) operation may be performed to generate layout data D30 from the netlist data D20. As shown in FIG. 16, the P&R operation S200 may include a plurality of operations S210, S220, and S230.

In operation S210, the standard cells may be placed. For example, a semiconductor design tool (for example, a P&R tool) may place a plurality of standard cells by referring to the standard cell library D50 from the netlist data D20. As described above, because the standard cells may have predetermined heights, the semiconductor design tool may place the standard cells on a grid including lines that intersect with each other with a predetermined length. Power rails may each extend in a direction overlapping the grid, and may be arranged at regular intervals.

In operation S220, interconnections may be generated. An interconnection may electrically couple an output pin of a standard cell with an input pin thereof, and may include, for example, at least one via and at least one conductive pattern. The generation of the interconnections may cause power gating cells and standard cells to be routed.

In operation S230, the layout data D30 may be generated. The layout data D30 may have a format such as GDSII, and may include geometric information of the standard cells and geometric information of the interconnections.

In operation S300, a mask may be manufactured. For example, patterns formed in a plurality of layers may be defined according to the layout data D30, and at least one mask (or photomask) for forming respective patterns of the plurality of layers may be manufactured.

In operation S400, the integrated circuit may be fabricated. For example, in operation S400, the integrated circuit may be fabricated by patterning the plurality of layers by using the at least one mask manufactured in operation S300. As shown in FIG. 16, the operation S400 may include operations S410 and S420.

In operation S410, a front end of line (FEOL) process may be performed. The FEOL process may be referred to as a process of forming individual devices, for example, a transistor, a capacitor, and a resistor, on a substrate during fabrication of an integrated circuit. For example, the FEOL process may include an operation of planarizing and cleaning a wafer, an operation of forming a trench, an operation of forming a well, an operation of forming a gate line, and an operation of forming a source and a drain.

In operation S420, a back end of line (BEOL) process may be performed. The BEOL process may be referred to as a process of interconnecting individual devices, for example, a transistor, a capacitor, and a resistor, with each other during fabrication of an integrated circuit. For example, the BEOL process may include an operation of silicidating a gate region, a source region, and a drain region, an operation of adding a dielectric, a planarization operation, an operation of forming a hole, an operation of adding a metal layer, an operation of forming a via, and an operation of forming a passivation layer. Next, the integrated circuit may be packaged into a semiconductor package and may be used as a component of various applications. In the BEOL process, namely, operation S420, patterns for routing power rails and a signal according to an embodiment of the disclosure may be formed.

Figure 17:
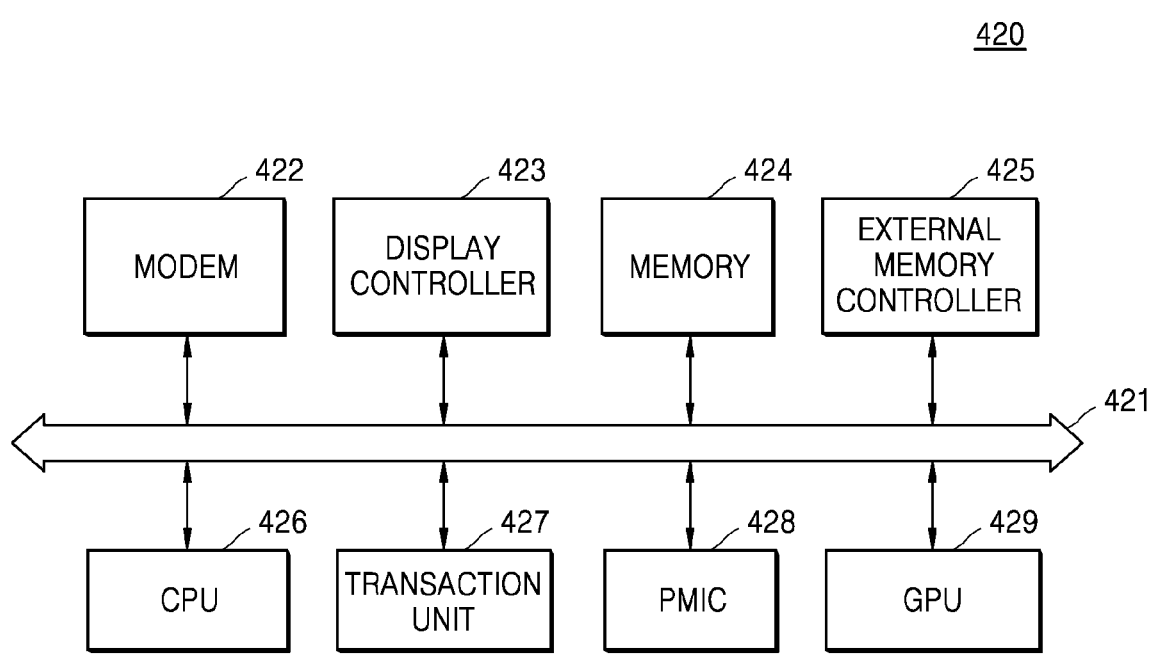
FIG. 17 is a block diagram of a system on chip (SoC) according to an embodiment of the disclosure.

FIG. 17 is a block diagram of a system on chip (SoC) 420 according to an embodiment of the disclosure. The SoC 420 is a semiconductor device, and may include an integrated circuit according to an embodiment of the disclosure. The SoC 420 is obtained by implementing complex function blocks, such as an IP, performing various functions in a single chip, and thus may efficiently supply power to each of the function blocks of the SoC 420, due to a structure of power gating cells capable of having a minimum resistance and a minimum capacitance according to embodiments of the disclosure.

Referring to FIG. 17, the SoC 420 may include a modem 422, a display controller 423, a memory 424, an external memory controller 425, a central processing unit (CPU) 426, a transaction unit 427, a power management integrated circuit (PMIC) 428, and a graphic processing unit (GPU) 429, and the function blocks of the SoC 420 may communicate with each other via a system bus 421.

The CPU 426 is able to entirely control the operations of the SoC 420, and may control operations of the other function blocks (422, 423, 424, 425, 427, 428, and 429). The modem 422 may demodulate a signal received from the outside of the SoC 420 or modulate a signal generated inside the SoC 420, and may transmit a result of the demodulation or modulation to the outside. The external memory controller 425 may control an operation of transmitting or receiving data to or from an external memory device connected to the SoC 420. For example, a program or data stored in the external memory device may be provided to the CPU 426 or the GPU 429 under the external memory controller 425. The GPU 429 may execute program instructions related with graphic processing. The GPU 429 may receive graphic data via the external memory controller 425, and may transmit graphic data processed by the GPU 429 to the outside of the SoC 420 via the external memory controller 425. The transaction unit 427 may monitor a data transaction of each function block, and the PMIC 428 may control power that is supplied to each function block under the control of the transaction unit 427. The display controller 423 may transmit data generated inside the SoC 420 to a display outside the SoC 420, by controlling the display outside the SoC 420.

For example, the memory 424 may be a non-volatile memory, such as an electrically erasable programmable read-only memory (EEPROM), a flash memory, a phase change random access memory (PRAM), a resistance random access memory (RRAM), a nano-floating gate memory (NFGM), a polymer random access memory (PoRAM), a magnetic random access memory (MRAM), or a ferroelectric random access memory (FRAM), or may be a volatile memory, such as a Dynamic Random Access Memory (DRAM), a Static Random Access Memory (SRAM), a mobile DRAM, a Double Data Rate Synchronous Dynamic Random Access Memory (DDR SDRAM), a Low Power DDR (LPDDR) SDRAM, a Graphic DDR (GDDR) SDRAM, or a Rambus Dynamic Random Access Memory (RDRAM).

Figure 18:
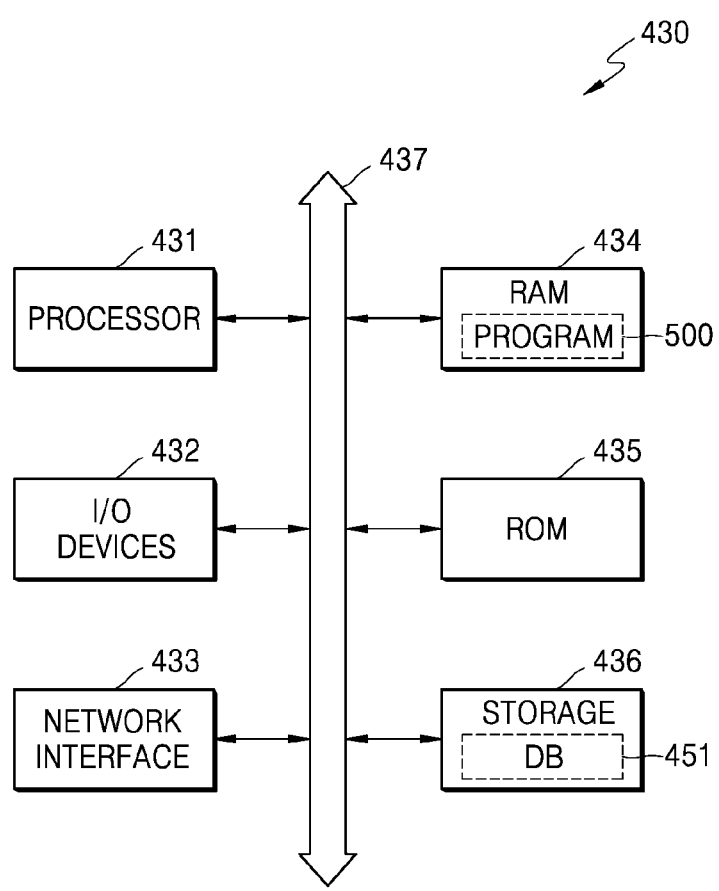
FIG. 18 is a block diagram of a computing system including a memory that stores a program, according to an embodiment of the disclosure.

FIG. 18 is a block diagram of a computing system 430 including a memory that stores a program, according to an embodiment of the disclosure. At least some of the operations included in a method of fabricating an integrated circuit according to an embodiment of the disclosure (for example, the method shown in FIG. 16) may be performed in the computing system 430.

The computing system 430 may be a stationary computing system, such as a desktop computer, a workstation, or a server, or may be a mobile computing system, such as a laptop computer. Referring to FIG. 18, the computing system 430 may include a processor 431, input/output (I/O) devices 432, a network interface 433, a random access memory (RAM) 434, a read only memory (ROM) 435, and a storage 436. The processor 431, the I/O devices 432, the network interface 433, the RAM 434, the ROM 435, and the storage 436 may be coupled with each other via a bus 437 and may communicate with each other via the bus 437.

The processor 431 may be referred to as a processing unit, and may include at least one core capable of executing any instruction set (e.g., Intel Architecture-32 (IA-32), 64-bit extension IA-32, x86-64, PowerPC, Sparc, MIPS, ARM, and IA-64), like a micro-processor, an application processor (AP), a digital signal processor (DSP), or a GPU. For example, the processor 431 may access a memory, namely, the RAM 434 or the ROM 435, via the bus 437, and may execute the instructions stored in the RAM 434 or the ROM 435.

The RAM 434 may store a program 500 for fabricating an integrated circuit according to an embodiment of the disclosure or at least a portion of the program 500, and the program 500 may enable the processor 431 to perform at least some of the operations included in the method of fabricating the integrated circuit. In other words, the program 500 may include a plurality of instructions executable by the processor 431, and, the plurality of instructions included in the program 500 may enable the processor 431 to perform, for example, the logic synthesis operation S100 and/or the P&R operation S200 of FIG. 16.

The storage 436 may not lose stored data even if power supplied to the computing system 430 is cut off. For example, the storage 436 may include a non-volatile memory, or may include a storage medium, such as a magnetic tape, an optical disk, a magnetic disk. The storage 436 may be detachable from the computing system 430. The storage 436 may store the program 500 according to an embodiment of the disclosure, and the program 500 or at least a portion thereof from the storage 436 may be loaded into the RAM 434 before the program 500 is executed by the processor 431. Alternatively, the storage 436 may store a file written in a programming language, and a program 500 generated by a compiler or the like or at least a portion of the program 500 from the file may be loaded into the RAM 434. As shown in FIG. 18, the storage 436 may store a database (DB) 451, and the DB 451 may include information necessary for designing the integrated circuit, for example, the standard cell library D50 of FIG. 16.

The storage 436 may store data that is to be processed by the processor 431, or data processed by the processor 431. In other words, according to the program 500, the processor 431 may generate data by processing the data stored in the storage 436, and may store the generated data in the storage 436. For example, the storage 436 may store the RTL data D10, the netlist data D20, and/or the layout data D30.

The I/O devices 432 may include an input device, such as a keyboard or a pointing device, and an output device, such as a printer or a display. For example, a user may trigger the execution of the program 500 by the processor 431 via the I/O devices 432, may input the RTL data D10 and/or the netlist data D20 of FIG. 16, and may check the layout data D30 of FIG. 16.

The network interface 433 may provide access to a network outside the computing system 430. For example, the network may include multiple computing systems and communication links, and the communication links may include wired links, optical links, wireless links, or any other type of links.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The disclosure has been particularly shown and described with reference to exemplary embodiments thereof. The terminology used herein is for the purpose of describing exemplary embodiments only and is not intended to be limiting of the disclosure. Therefore, it will be understood by those skilled in the art that various changes in form and details may be made therein without departing from the spirit and scope of the disclosure as defined by the appended claims.

What is claimed is:

1. An integrated circuit comprising:
    an intellectual property (IP) block comprising a plurality of standard cells;
    a first power gating cell arranged to supply power to the IP block via a first power rail extending in a first horizontal direction, and comprising a first conductive line extending in a second horizontal direction perpendicular to the first horizontal direction in a first metal layer; and
    a second power gating cell arranged adjacent to the first power gating cell in the second horizontal direction to supply power to the IP block via a second power rail extending in the first horizontal direction, and comprising a second conductive line extending in the second horizontal direction in the first metal layer, wherein
    the first conductive line is coupled with the second conductive line in the second horizontal direction.

2. The integrated circuit of claim 1, wherein:
    the first power gating cell further comprises a third conductive line coupled with the first power rail and extending in the first horizontal direction,
    the second power gating cell further comprises a fourth conductive line coupled with the second power rail and extending in the first horizontal direction, and
    a second metal layer in which the third conductive line and the fourth conductive line are formed is different from the first metal layer.

3. The integrated circuit of claim 1, wherein:
    the first power gating cell further comprises a third conductive line and a fourth conductive line each coupled with the first power rail and extending in the first horizontal direction, and
    the second power gating cell further comprises a fifth conductive line and a sixth conductive line each coupled with the second power rail and extending in the first horizontal direction,
    the third conductive line and the fifth conductive line are formed in a second metal layer, and
    the fourth conductive line and the sixth conductive line are formed in a third metal layer.

4. The integrated circuit of claim 3, wherein the second metal layer, the first metal layer, and the third metal layer are sequentially arranged and spaced apart from each other in a vertical direction.

5. The integrated circuit of claim 3, wherein:
    the first conductive line is not directly coupled with the third conductive line and the fourth conductive line through a via, and
    the second conductive line is not directly coupled with the fifth conductive line and the sixth conductive line through a via.

6. The integrated circuit of claim 3, wherein:
    the third conductive line and the fifth conductive line route a first voltage signal, and the fourth conductive line and the sixth conductive line route a second voltage signal to each of the first power rail and the second power rail,
    the first conductive line is directly coupled with at least one of the third conductive line and the fourth conductive line through a via, and
    the second conductive line is directly coupled with at least one of the fifth conductive line and the sixth conductive line through a via.

7. The integrated circuit of claim 1, wherein a sum of a length of the first conductive line and a length of the second conductive line is equal to or greater than n times a length of each of the standard cells in the second horizontal direction, and n is an integer equal to or greater than 4.

8. The integrated circuit of claim 1, wherein the first conductive line extends in the second horizontal direction from a bottom boundary of the first power gating cell to a top boundary of the first power gating cell, and the top boundary and the bottom boundary are opposite to each other in the second horizontal direction.

9. The integrated circuit of claim 1, wherein the first conductive line extends in the second horizontal direction from a point that is a predetermined distance away from a top boundary of the first power gating cell in the second horizontal direction to a bottom boundary of the first power gating cell.

10. The integrated circuit of claim 9, wherein the first power gating cell is arranged to supply power to standard cells that face a top boundary of the IP block.

11. The integrated circuit of claim 9, wherein the first power gating cell is arranged to supply power to standard cells that face a bottom boundary of the IP block.

12. The integrated circuit of claim 1, wherein the first conductive line extends in the second horizontal direction from a top boundary of the first power gating cell to a point that is a predetermined distance away from a bottom boundary of the first power gating cell in a third horizontal direction opposite the second horizontal direction.

13. The integrated circuit of claim 1, further comprising:
a third power gating cell arranged adjacent to the second power gating cell in the second horizontal direction to supply power to the IP block via a third power rail extending in the first horizontal direction, the third power gating cell comprising a third conductive line extending in the second horizontal direction in the first metal layer, wherein
the third conductive line is coupled with the second conductive line in the second horizontal direction.

14. The integrated circuit of claim 1, further comprising:
a third power gating cell arranged adjacent to the first power gating cell in a third horizontal direction opposite the second horizontal direction to supply power to the IP block via a third power rail extending in the first horizontal direction, the third power gating cell comprising a third conductive line extending in the second horizontal direction in the first metal layer, wherein:
the first power gating cell further comprises a fourth conductive line extending in the third horizontal direction from a point that is a predetermined distance away from the first conductive line in the third horizontal direction in the first metal layer, and
the third conductive line is coupled with the fourth conductive line in the second horizontal direction.

* * * * *